Figure 5:
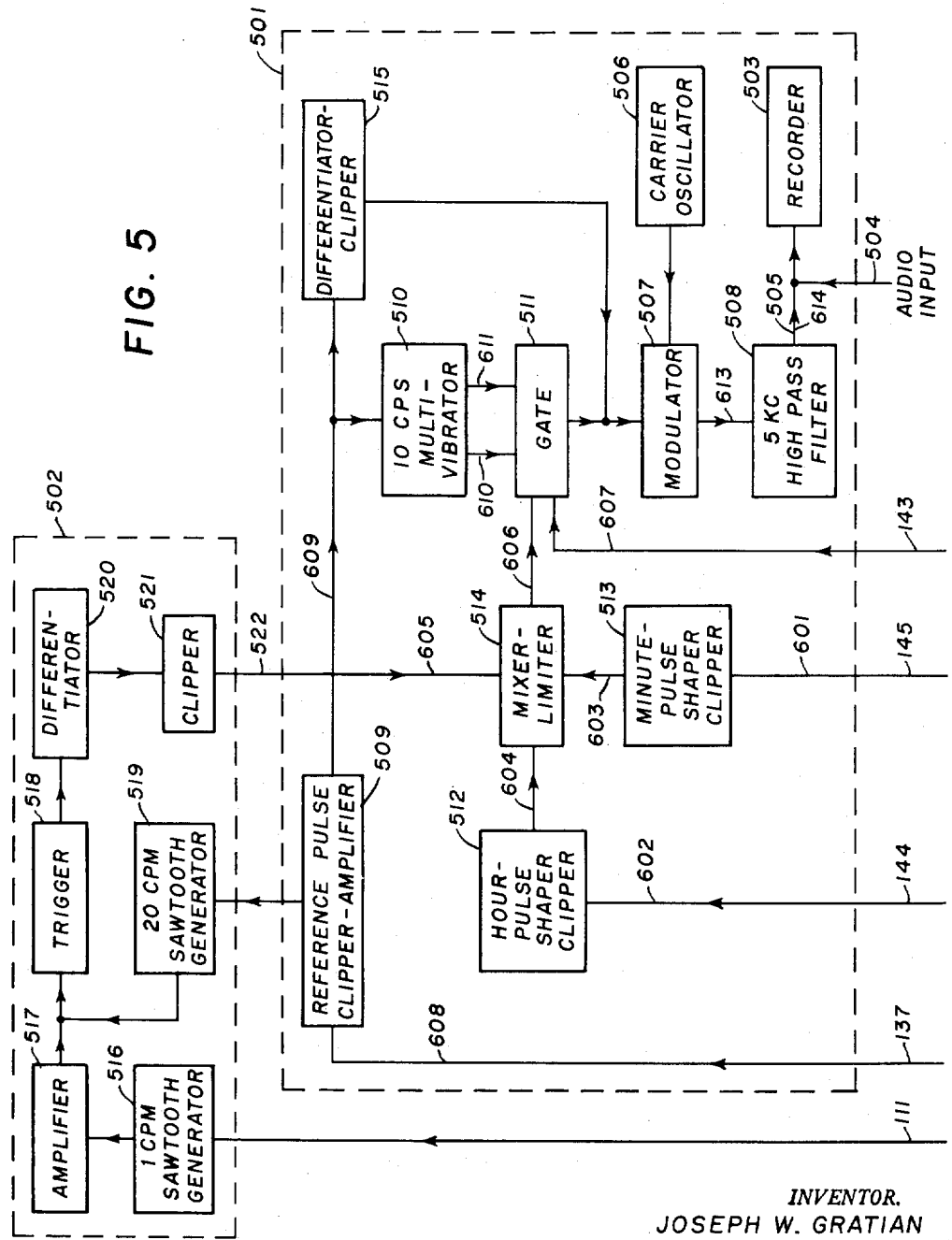

Jan. 10, 1956   J. W. GRATIAN   2,730,699
TELEMETERING SYSTEM
Filed Feb. 1, 1952   11 Sheets-Sheet 1
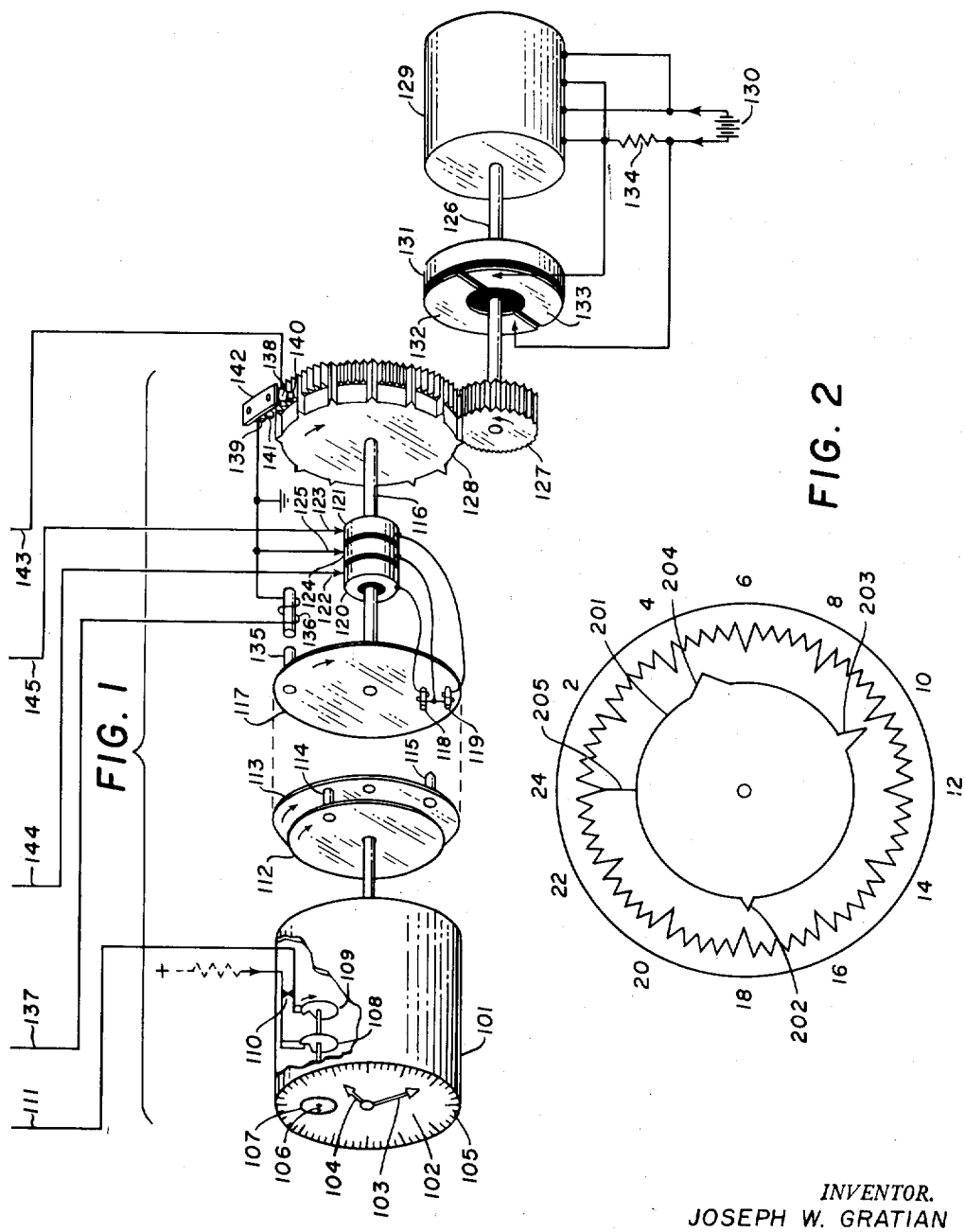
INVENTOR.
JOSEPH W. GRATIAN
BY J. L. Bowes
ATTORNEY Jan. 10, 1956  J. W. GRATIAN  2,730,699
TELEMETERING SYSTEM
Filed Feb. 1, 1952  11 Sheets-Sheet 2
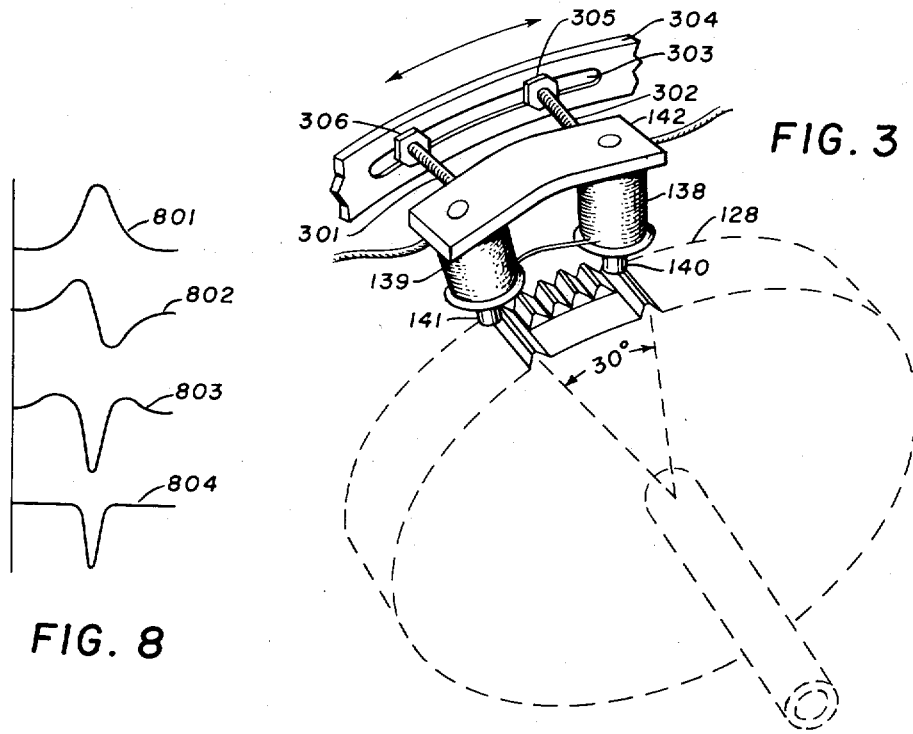
FIG. 3
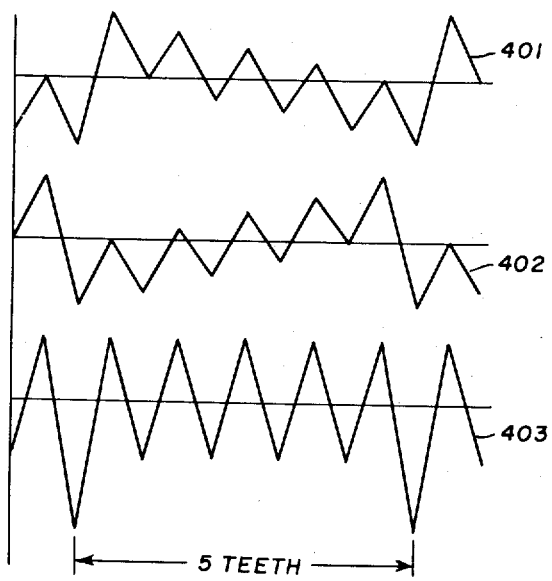
FIG. 8
FIG. 4
INVENTOR.
JOSEPH W. GRATIAN
BY J. L. Bower
ATTORNEY

INVENTOR.
JOSEPH W. GRATIAN
BY
ATTORNEY

INVENTOR.
JOSEPH W. GRATIAN
BY J. L. Bower
ATTORNEY

Jan. 10, 1956    J. W. GRATIAN    2,730,699
TELEMETERING SYSTEM

Filed Feb. 1, 1952    11 Sheets-Sheet 7

INVENTOR.
JOSEPH W. GRATIAN
BY
J. L. Bowes
ATTORNEY

INVENTOR.
JOSEPH W. GRATIAN

INVENTOR.
JOSEPH W. GRATIAN

INVENTOR.
JOSEPH W. GRATIAN
BY J. L. Bowes
ATTORNEY

United States Patent Office

2,730,699
Patented Jan. 10, 1956

2,730,699

TELEMETERING SYSTEM

Joseph W. Gratian, Rochester, N. Y., assignor, by mesne assignments, to General Dynamics Corporation, a corporation of Delaware Application February 1, 1952, Serial No. 269,496

24 Claims. (Cl. 340—212)

My invention relates to telemetering systems, and particularly to means for telemetering the position of an index member of a quantity indicating means.

According to Webster's New International Dictionary, Unabridged, the word "telemeter" means "to transmit electrically to a distant station, and there indicate or record, the value of a quantity." This definition does not specify that the telemetering process is to occur instantaneously, and I therefore wish to employ the word in this specification to include the situation wherein the information derived is stored on a recording medium and later recovered from that medium. Furthermore, since my invention is adapted to the recovery of information at a location adjacent to the transmitting point, and since the recovery may occur simultaneously or at a later time, I do not wish to be limited through the dictionary definition of the word "telemeter" to the recovery of information at a distant point.

In this specification, I shall use the term "index member" to mean an indicating needle, hand, pointer, or the like, and I shall use "quantity-indicating means" to include devices such as meters, gages, knobs, or the like. I wish to point out that in telemetering systems of the sort in which my invention finds application, the index member is generally adapted to register against a scale of indicia which represent units or subunits of physical quantity. These units may be electrical units, units of pressure, temperature, humidity, etc., or may be units of time. The units may be abstract, as in a computing machine, where the quantity-indicating means may represent different physical quantities on various occasions. The scale may be merely associated with the index member, i. e., the presence of the scale may be implied even though it may be omitted because there is no human agency nearby to read it. Similarly, the presence of a pointer may be implied. Quantity-indicating means of the type to which my invention is applicable usually have an index member which is adapted for rotary movement, but a person skilled in the art could readily apply my invention to other types of motion, such as linear. Furthermore, one skilled in the art could readily convert linear motion into rotary motion, as by rock-and-pinion gearing. Half of the problem in telemetering information is transmission; the remaining half is the presentation of data at the reception point. In accordance with my invention, I employ a sampling technique to obtain the data at the transmitting end of the system and I use a cathode-ray tube to present the data at the receiving end. My invention has found particular application to telemetering the time of day as measured by a clock. In this case, the clock face is represented on the screen of a cathode-ray tube with the indicia representing hours and minutes as well as the position of the hands appearing as pips on concentric circles.

It is accordingly the broad object of my invention to provide a new and improved telemetering system, and specifically one in which the position of the quantity-indicating means is sampled and the sampled information so obtained is visually displayed on a cathode-ray tube screen.

It is a further object of my invention to provide a telemetering system in which a scanning member is cyclically moved past the index member whose position is to be telemetered in such a way that a pulse is generated at each passage of the scanning member, and the pulse is used to present the index member position on the trace of a cathode-ray tube.

It is another object of my invention to provide a telemetering system in which a magnetic member is mounted for rotation with the index member and the magnetic member is cyclically scanned with a magnetic pickup means, thereby generating a pulse which is used to display the position of the index member on the trace of a cathode-ray tube.

It is still another object of my invention to provide a telemetering system including a magnetic means mounted for rotation with the index member and a continuously-rotating scanning member carrying a magnetic pickup means for generating a pulse as the pickup means is rotated past the magnetic means, and to provide means for storing the pulse so generated on a recording medium and for later recovering that information to present it on the trace of a cathode-ray tube.

It is a further object of my invention to provide a telemetering system in which the positions of a plurality of index members are indicated on the screen of a cathode-ray tube, the positional information being conveyed by the time of occurrence of pulses within a scanning period, and in which the amplitude of a pulse resulting from time coincidence of the pulses is substantially the same as the amplitude of the larger of the pulses, and in which the identity of the pulses is substantially preserved during the approach to, and recession from, time coincidence of the pulses.

It is still another object of my invention to provide, in a telemetering system including a measuring means having spaced-apart indicia of quantity associated therewith, means for generating a train of pulses and for applying the pulses to a cathode-ray tube such that there are produced on the trace of the cathode-ray tube indications having spacings and lengths corresponding to those of the indicia.

It is still another object of my invention to provide, in a telemetering system, means for cyclically passing a scanning member past a movable index member for generating a pulse at each passage, and for synchronizing the circular sweep of a cathode-ray tube with the pulse.

It is a still further object of my invention to provide a telemetering system in which a square wave is translated into pulses occurring at the change-of-potential points of the square wave, and a circular sweep for a cathode-ray tube is derived from the pulses through reconstruction of the square wave.

It is a further object of my invention to provide, in a telemetering system, means for storing on a recording medium information regarding the speed of a continuously-rotating member, and for synchronizing a circular sweep circuit of a cathode-ray tube with information recovered from the recording medium.

It is a still further object of my invention to provide, in a telemetering system including means for alternately sampling the position of a movable index member of a quantity indicating means, for registering quantity scale indicia, and for displaying both the index member position and the indicia on a cathode-ray tube screen, means for registering the zero position of the movable index with the zero one of the quantity-indicating indicia, regardless of the spatial orientation of the screen.

It is a still further object of my invention to provide a telemetering system for visually displaying a portion of a clock hand on a cathode-ray tube screen.

It is a further object of my invention to provide a telemetering system including means for cyclically passing a scanning member past the hand of a clock, for generating a pulse at each passage, and for employing the pulse to produce an indication on the trace of a cathode-ray tube of the relative position of the hand.

It is another object of my invention to provide a telemetering system in which the positions of the hands of a clock are represented by pips on the circular trace of a cathode-ray tube, and in which, in case the hands are superimposed, the indication on the screen of the cathode-ray tube is no greater than that corresponding to the larger of the two pips, and the identity of the hands is substantially preserved during the approach to, and recession from, superimposition of the hands.

It is another object of my invention to provide a telemetering system in which information regarding the spaced-apart indicia representing divisions of time associated with the scale of a clock is represented by a train of pulses applied to a signal circuit of a cathode-ray tube, thereby producing on the trace of a cathode-ray tube indications spaced apart by distances proportional to those separating the indicia.

It is a further object of my invention to provide a telemetering system in which the indicia of the time scale of a clock are translated into pulses whose magnitude corresponds to the respective lengths of the indicia, and in which the pulses are used to produce indications on the trace of cathode-ray tube of both the relative positions and the lengths of the indicia.

It is still another object of my invention to represent the face of a clock on the circular sweep of a cathode-ray tube.

It is still another object of my invention to provide a telemetering system in which there is alternately displayed, on the screen of a cathode-ray tube, indications representing divisions of time and the position of a clock hand.

It is another object of my invention to provide a telemetering system in which information regarding the indicia of the time scale of a clock and the position of a clock hand is stored on a recording medium and is later recovered from the recording medium to display on the screen of a cathode-ray tube indications of the indicia and of the hand.

It is another object of my invention to provide a telemetering system in which the scale of indicia representing divisions of time and the hand of a clock are presented on the trace of a cathode-ray tube, and the zero time position of the hand is registered with the zero indicia of the scale, regardless of the spatial orientation of the cathode-ray tube screen.

It is another object of my invention to provide a telemetering system in which the positions of the hands of a clock are sampled and are represented on the screen of a cathode-ray tube and in which a subdivision of time smaller than that indicated by the hands of the clock is measured electronically and is also presented on the screen of the cathode-ray tube.

Further objects and advantages of my invention will become apparent as the following description proceeds, and the features of novelty which characterize my invention will be pointed out with particularity in the claims annexed to and forming a part of this specification.

Figure 6:
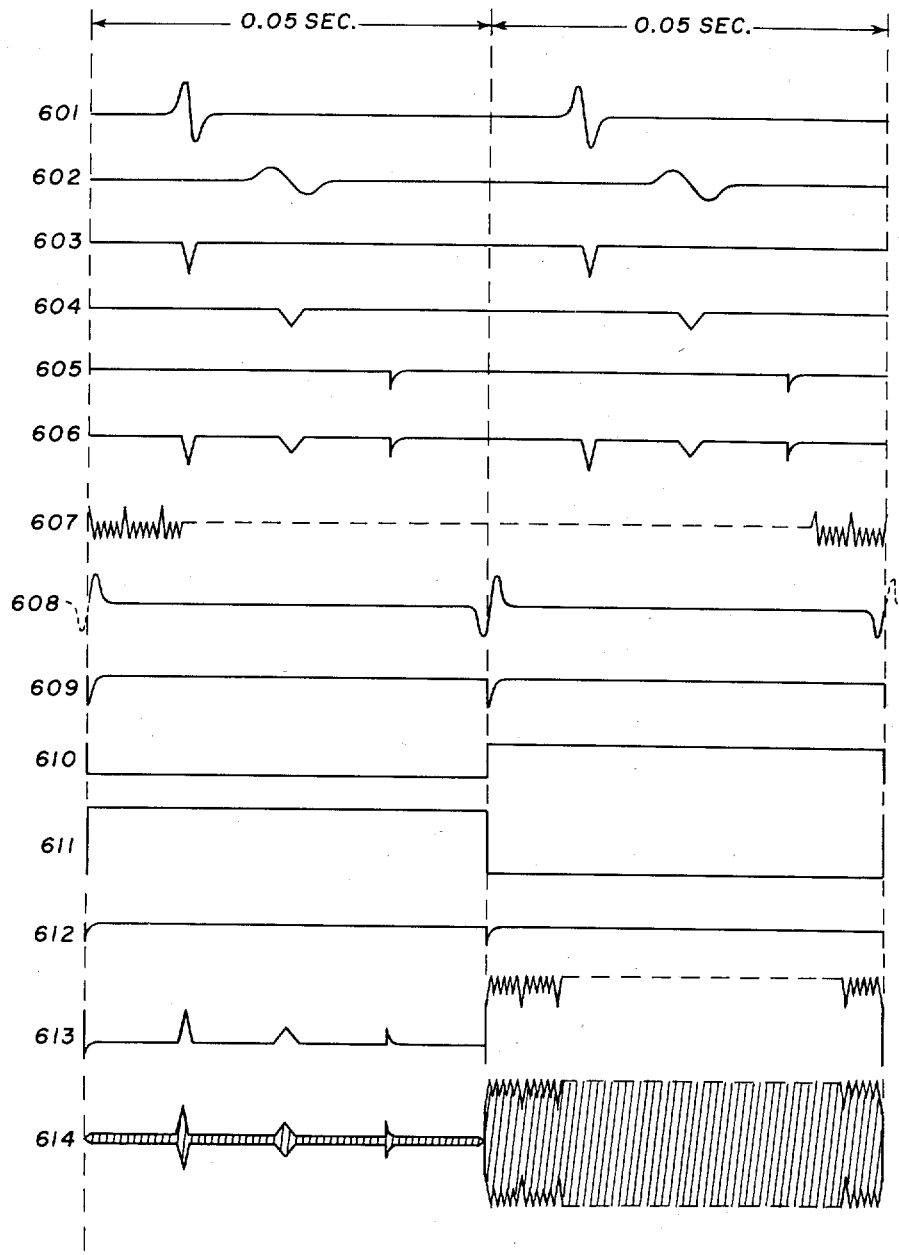
Figure 7:
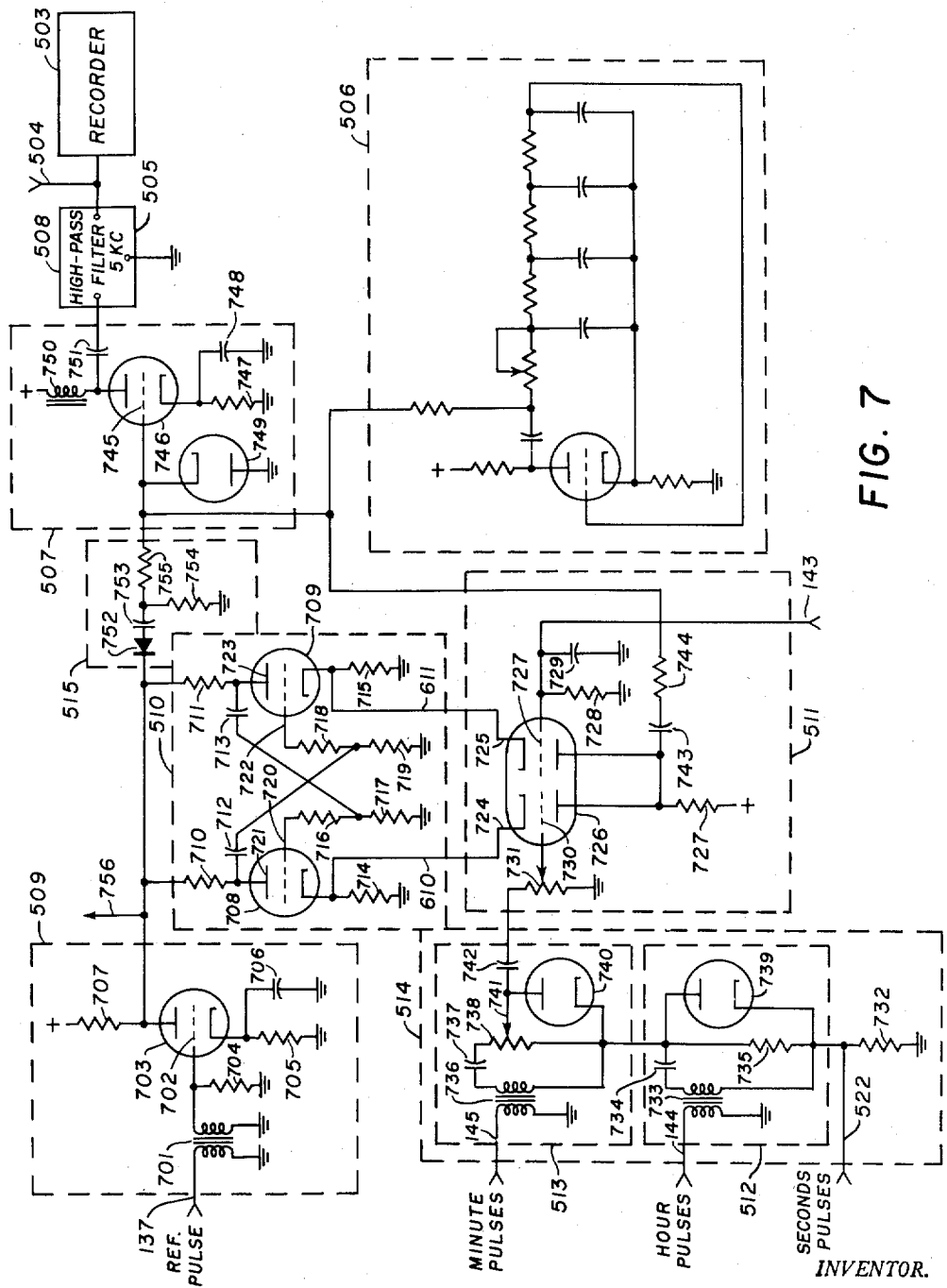
Figure 9:
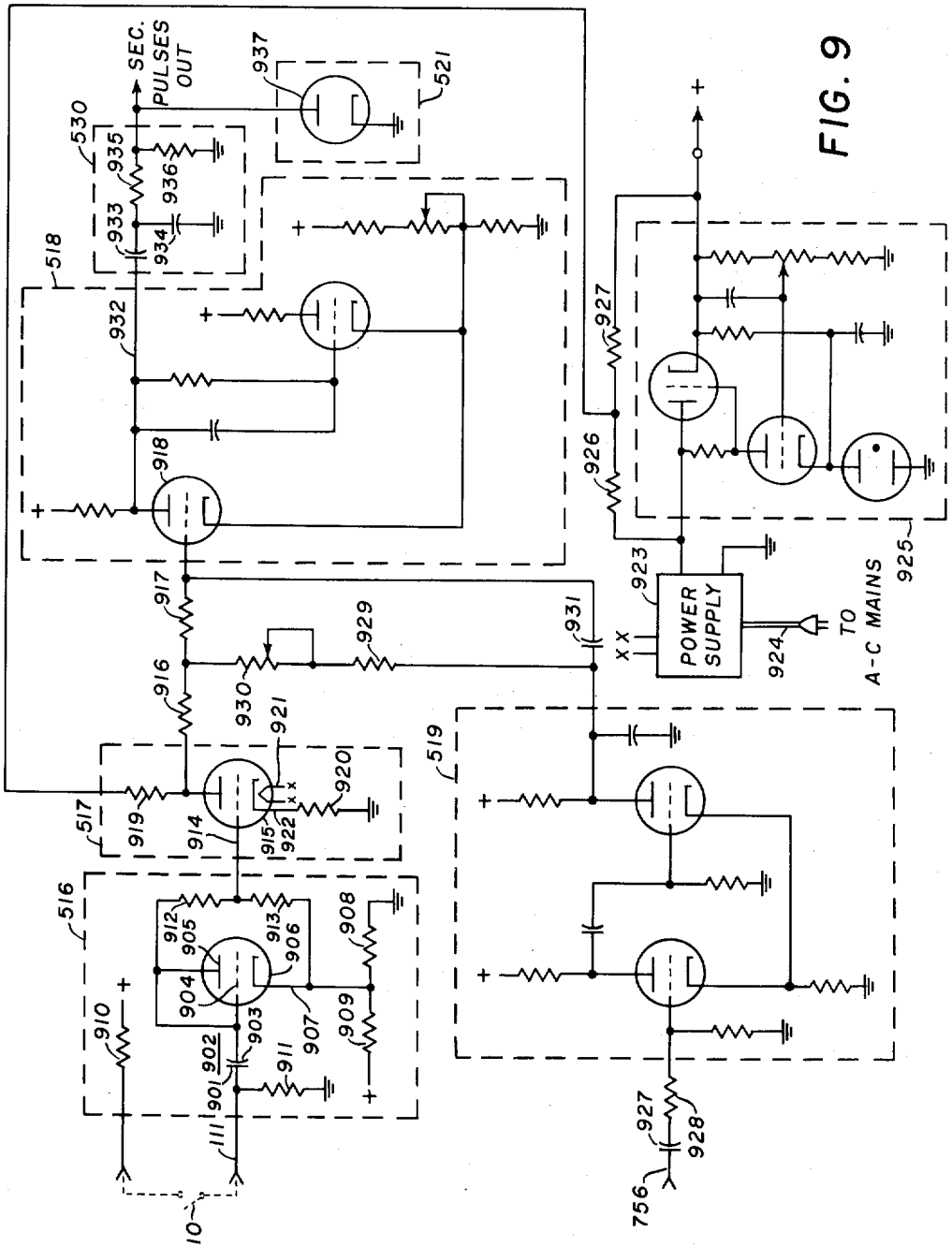
Figure 10:
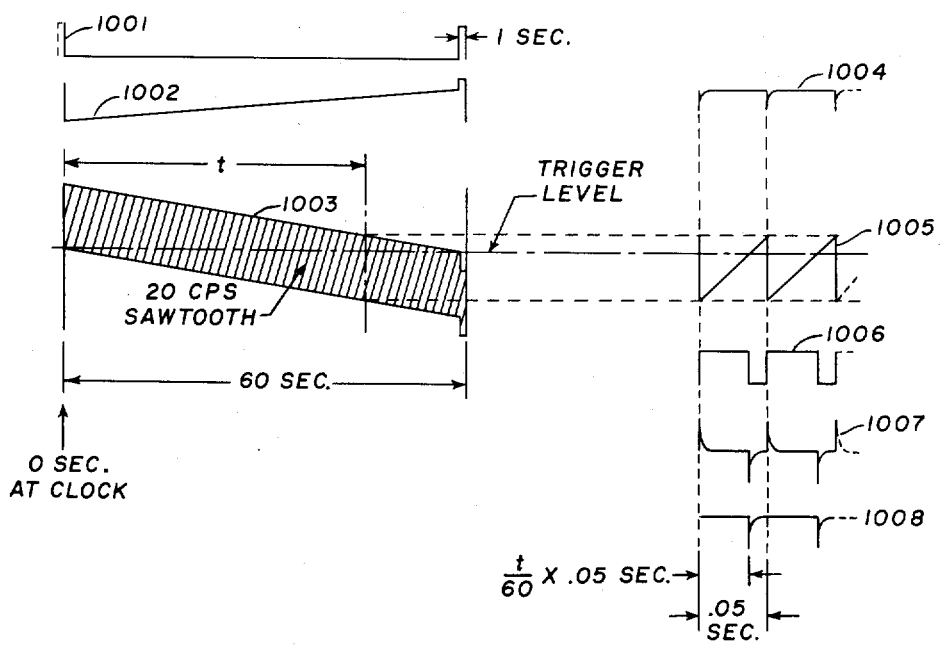
Figure 15:
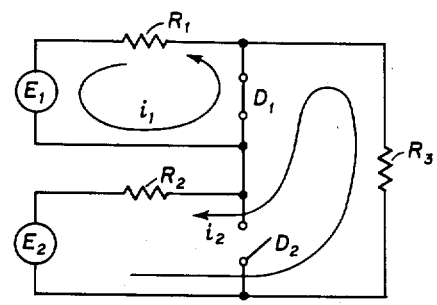
Figure 11:
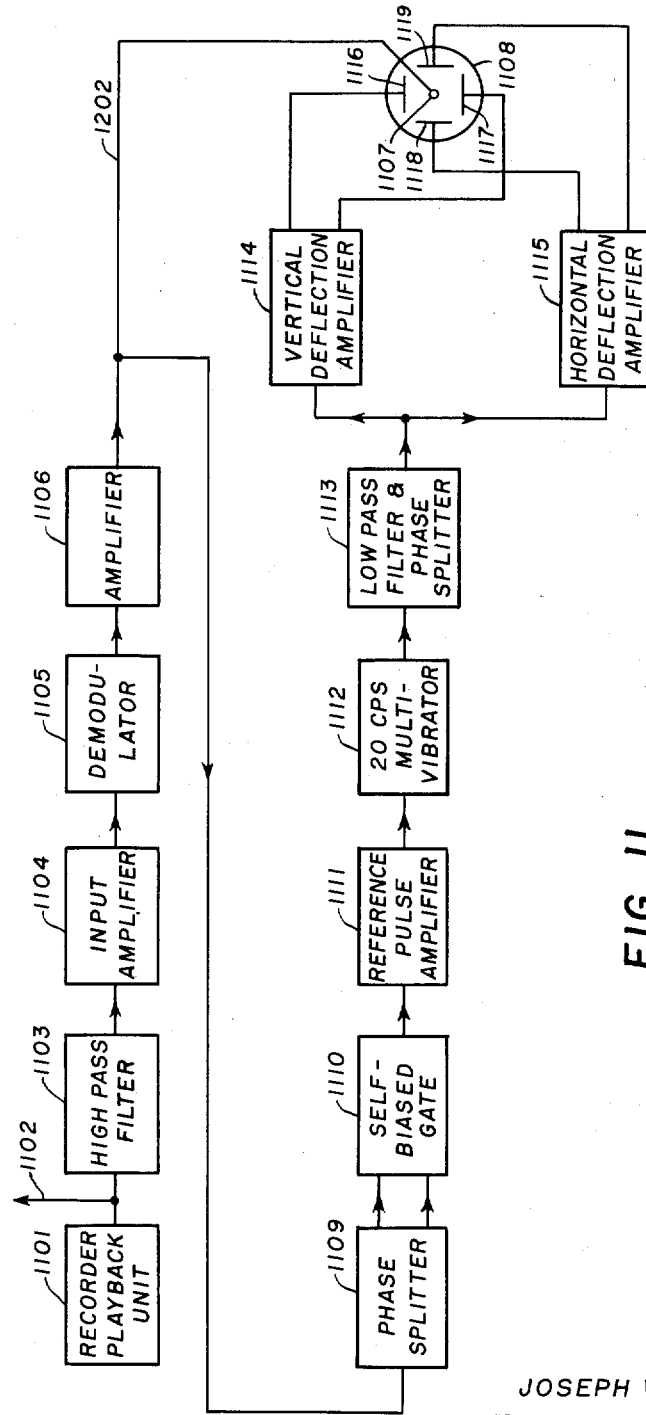
Figure 12:
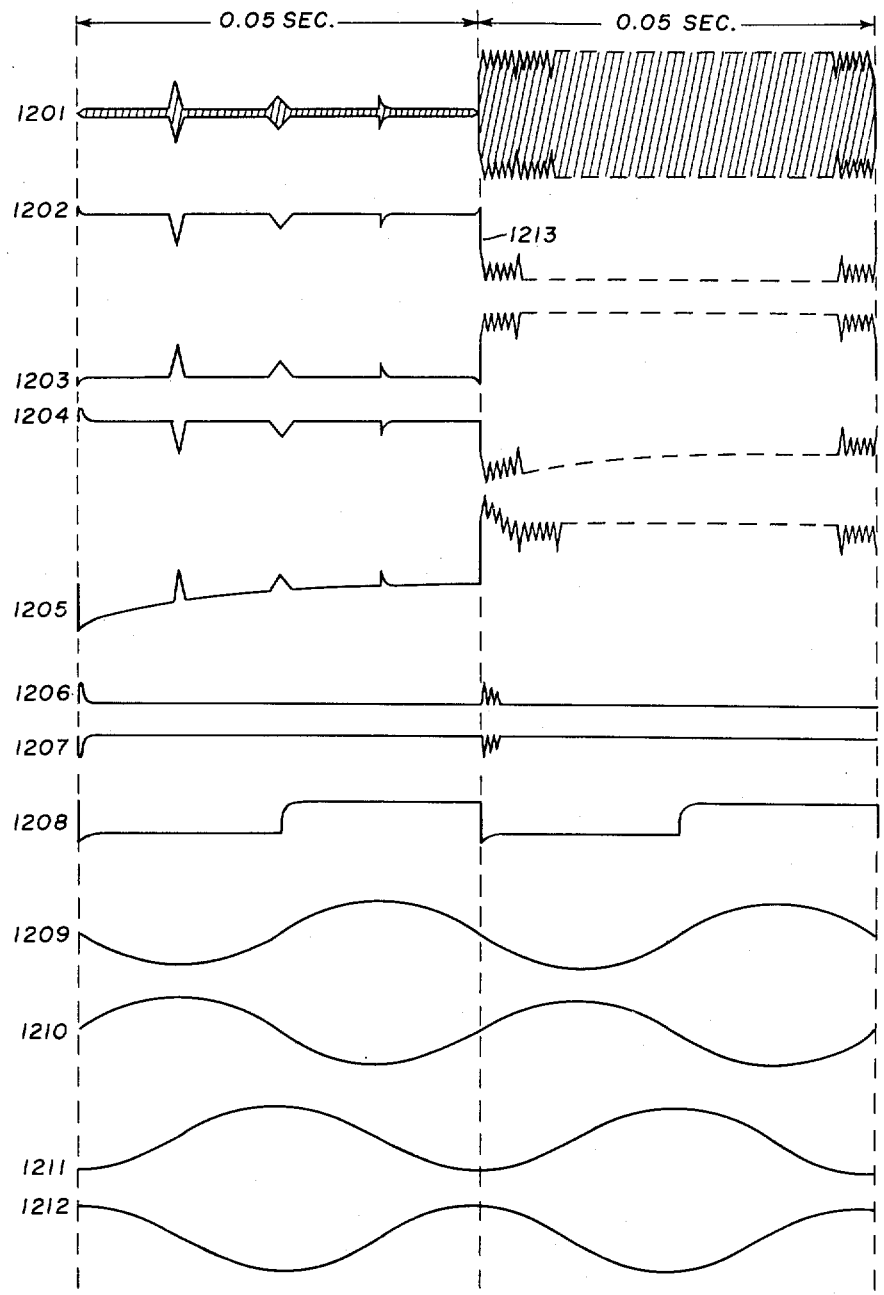
Figure 13:
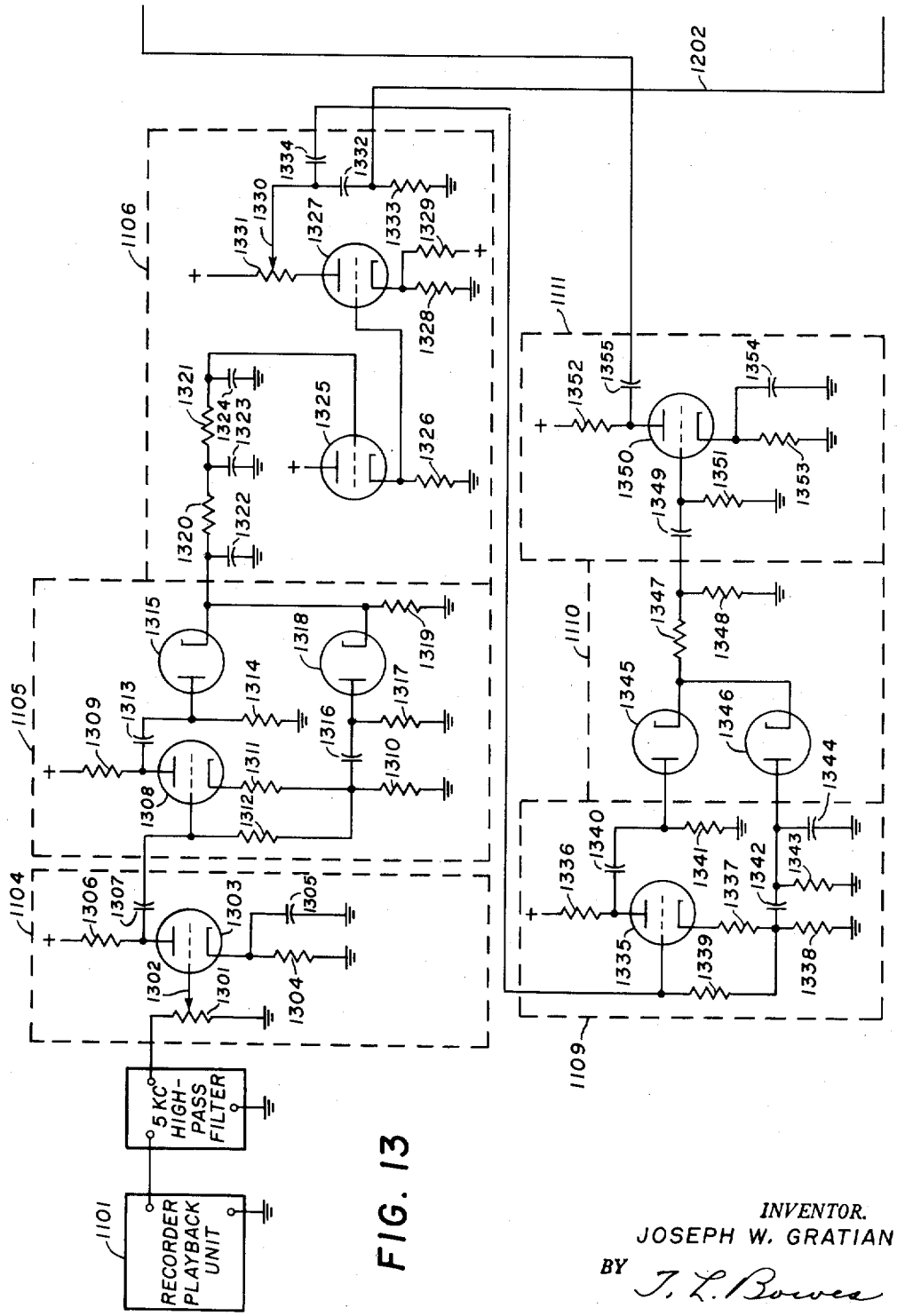
Figure 14:
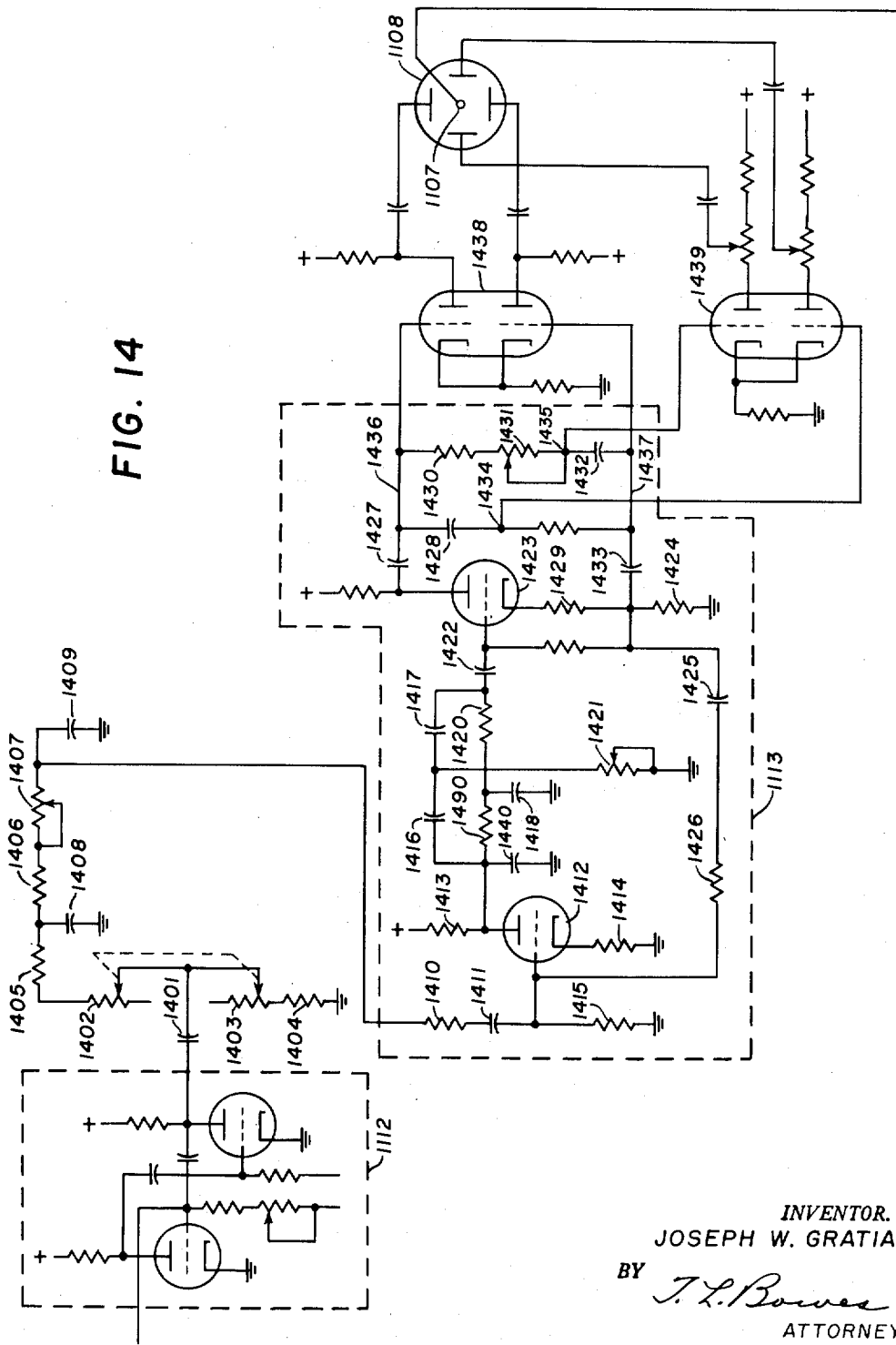

For a better understanding of my invention, reference may be had to the accompanying drawing in which Fig. 1 is an exploded view of a portion of one embodiment of my invention, Fig. 2 is a view of the screen of a cathode-ray tube on which is presented the data derived from the embodiment of my invention shown in Fig. 1, Fig. 3 is a detailed view of a portion of the apparatus shown in Fig. 1, Fig. 4 is a chart of the waveforms associated with the apparatus illustrated in Fig. 3, Fig. 5 is a block diagram of apparatus comprising another portion of the embodiment of my invention shown partially in Fig. 1, Fig. 6 is a chart of the waveforms associated with the apparatus diagrammed in Fig. 5, Figure 7 is a schematic wiring diagram of some of the apparatus shown in block diagram form in Fig. 5, Fig. 8 shows some of the waveforms encountered within the circuit of Fig. 7, Fig. 9 is a schematic wiring diagram of another portion of the apparatus shown in block diagram form in Fig. 5, Fig. 10 illustrates waveforms encountered in the circuit of Fig. 9, Fig. 11 is a block diagram of the apparatus included in the receiving end of the present embodiment of my invention, Fig. 12 illustrates waveforms encountered in the circuit of Fig. 11, Figs. 13 and 14, when laid side-by-side with corresponding lines in alignment, show a schematic wiring diagram of the apparatus represented in Fig. 11, and Fig. 15 is a simplified schematic diagram useful in explaining my invention.

To simplify the explanation of the embodiment of my invention shown in these Figures, I have adopted a system of assigning a block of reference symbols to each figure. Thus, numerals from 101 to 199 are reserved for Fig. 1, from 201 to 299 for Fig. 2, and so on. In this way, a reference to, say, symbol 1205 tells the reader that the thing identified by this symbol is to be found in Fig. 12.

As intimated earlier, a telemetering system basically comprises a transmitting end and a receiving end. The embodiment of my invention which I have elected to describe and show in the accompanying drawings has for its purpose the telemetering of information regarding time of day. Figs. 1 and 5 indicate the equipment included in the "time transmitter" at the transmitting end of the system, while Fig. 11 shows that comprising the "time translator" at the receiving end of the system.

*Basic time transmitter*

As shown in Fig. 1, the transmitting portion of this particular embodiment of my invention includes a suitable clock 101. This clock may have a 24-hour movement governed by an escapement of high precision and a motor for winding the main spring automatically as required to maintain optimum tension for maximum accuracy. The face 102 of the clock has a minute hand 103 and an hour hand 104. These hands register against a scale 105 of indicia around the periphery of the clock face. Seconds indication is provided by a second hand 106 having a separate scale of indicia 107. The clock 101 is shown with a portion of its case broken away in order to illustrate the presence of cams 108 and 109. These cams maintain contacts 110 closed throughout the 59th second only of each minute. A one-second pulse of voltage therefore appears on lead 111 for a purpose which will be explained later.

On the back portion of clock 101 are two coaxial, nonmagnetic disks 112 and 113, respectively keyed to the shafts carrying hour hand 104 and minute hand 103. Each disk carries a small permanent magnet (114 and 115, respectively) near its periphery. Magnet 114 is seen to have a blunter end than magnet 115 and to be mounted at a shorter distance from the center of the disks.

A shaft 116 is provided for rotation coaxial with the shafts carrying disks 112 and 113. To one end of shaft 116 is secured a scanning member 117. Two pickup coils 118 and 119 are mounted on member 117. These coils are preferably located on a given radial line extending from the center of shaft 116, with the radial distances of each coil from that center being equal to the radial distance of magnet 114 and magnet 115, respectively, from the center of the shafts carrying disks 112 and 113. Member 117 is located, in the assembled, "unexploded" apparatus, sufficiently close to the rear end of clock 101 for magnets 114 and 115 to induce a pulse of current in coils 118 and 119, respectively, if passage of the coils past the magnets is sufficiently rapid. Pulses resulting from such passages are taken off the rotating portion of the apparatus by means of slip rings 120, 121 and brushes 122, 123, the ground return being through ring 124 and brush 125.

A continuous rotary motion is imparted to scanning member 117 by means of shaft 126 and gears 127 and 128. Shaft 126 is driven by motor 129, power for which is derived from battery 130. A governor 131 is preferably employed to maintain the speed of motor 129 substantially constant. Governor 131 may be a conventional type having commutator segments 132 and 133; its operation will not be described except to say that when the motor speed decreases to a predetermined point, series field resistor 134 is short-circuited and consequently causes the motor to speed up. When the motor speeds up sufficiently, the opposite effect occurs. The net result is to maintain the speed of motor 129 substantially constant.

From the foregoing it can be seen that the positions of hands 103 and 104 are represented by magnets 114 and 115, respectively, and that these positions are "sampled" once in each revolution of scanning member 117. The information regarding the sampled positions of the hands is contained in the positions within the scanning period of the pulses induced in coils 118 and 119.

Scanning member 117 carries permanent magnet 135. At each rotation of the scanning member 117, magnet 135 passes a stationarily-mounted pickup coil 136. The air gap between magnet 135 and pickup coil 136 is sufficiently small when these elements are opposite each other to result in the generation of a pulse of voltage which thereupon appears on lead 137.

It will be noted that gear 128 has half of most of its teeth removed, only every fifth tooth extending clear across the gear face. Centered above the gear face is a pair of pickup coils 138 and 139 wound respectively on permanent magnet cores 140 and 141. These cores are held in spaced-apart relation by means of stationarily-mounted member 142. Coils 138 and 139, together with magnets 140 and 141 and member 142, form a stator, while gear 128 forms a rotor. As the gear 128 is driven past the pole faces of magnets 140 and 141, the reluctance of the magnetic path including the air gaps between the respective pole faces and the gear itself, is varied. The resulting variation in flux linking coils 138 and 139 therefore results in a voltage induced in those coils. This voltage appears on lead 143.

Fig. 2 illustrates how the time data gathered by the apparatus of Fig. 1, operating in conjunction with the elements indicated in Fig. 5, may be presented on the face of a cathode-ray tube. The time scale indicia are represented on the outer circular sweep as pips extending radially inward. Every fifth one of the indicia is identified by its greater radial length. Since clock 101 is a 24-hour clock, these longer indicia represent two-hour intervals of time when the hour hand is read, but represent the conventional five-minute intervals when the minute hand is read.

In the form of clock 101 which has found employment in the embodiment of my invention being described, the seconds hand shaft has torque sufficient only to actuate contacts 110, this actuation occurring only during the 59th second of each minute. Means are provided according to my invention, however, for seconds representation on the screen of a cathode-ray tube, and hence the longer ones of the indicia also represent five-second intervals relative to the second hand. The apparatus required to present seconds information may be omitted where such accuracy in telling time is not needed.

An inner circular trace 201 on the screen of the cathode-ray tube has pips extending radially outward to represent the positions of the time-indicating clock hands, including a second hand where second hand apparatus is employed. The second-hand pip is represented by reference symbol 202, the minute hand by reference symbol 203, and the hour hand by symbol 204. The hour hand representation is seen to be shorter and broader than the minute hand, in accordance with the conventional relative proportions of these hands on actual clocks. A reference mark 205 is provided to indicate the zero position of the hands and of the indicia scale alike. The time shown on the screen of the cathode-ray tube in Fig. 2 is 25 minutes and 45 seconds past 4 o'clock.

The relationship shown in Fig. 1 between gear 128 and coils 138 and 139 is shown in greater detail in Fig. 3. The support for these coils, member 142, is supported in turn by adjustable screws 301 and 302 which may be moved relative to slot 303 in bracket 304 by loosening nuts 305 and 306. Bracket 304 may be stationarily mounted by any convenient means.

It will be noted that the pole faces of magnets 140 and 141, have their centers spaced apart by a distance equal to five and one-half teeth on gear 128. Furthermore, coils 138 and 139 are connected in series opposition. This arrangement and spacing of the coils forms a feature of my invention, since the use of a variable reluctance indicia generator with only one coil and a gear wheel of the type shown would result in the unsymmetrical waveform illustrated by 401 in Fig. 4. It will be noted that a strong low-frequency component is present as the result of each fifth tooth extending farther across the gear face than the other gear teeth. According to my invention, however, the waveform 401 induced in one of the coils is added algebraically to waveform 402 induced in the other coil by means of the series-opposition connection. By means of the half-tooth displacement, the algebraic addition of waveforms 401 and 402 results in a waveform 403 having greater amplitude than either waveform 401 or 402, but with no low-frequency component. The distance between major peaks of waveform 403, it will be noted, corresponds to the spacing between the longer gear teeth.

A similar graphical analysis shows that the same result would obtain if the spacing were 4½ instead of 5½ teeth apart, and such a spacing is also within the scope of my invention. The arrangement may be generalized by saying that every Nth tooth, or protrusion, on gear 128 gives rise to a pulse of greater amplitude than the other teeth, and that by connecting pickup-coils 138 and 139 in series opposition and spacing apart the face centers of poles 140 and 141 by a distance equal to the distance between the Nth ones of the teeth plus or minus half the distance between adjacent teeth, the undesired low-frequency components are canceled from the output of the pickup coils. For a complete understanding of the "time transmitter," Fig. 5 is to be placed above Fig. 1 with the corresponding lines in alignment. Upon examination, Fig. 5 will be seen to comprise a main section 501 and a subsidiary section 502. The first of these sections is used to telemeter information regarding the scale of indicia and the positions of the hour and minute hands relative to those indicia. Subsidiary section 502, being designed to provide second-hand positional information electronically, is known as a "seconds generator." As pointed out earlier, its use, while forming a feature of my invention, is optional, depending upon whether second-hand information is desired at the receiving end of the telemetering system.

I have chosen to illustrate my invention as applied to a telemetering system in which the information is stored on a recording medium along with other information. For this reason, I indicate a recorder 503, which may be of the magnetic tape variety. The input line 504 may be a speech channel, for example, in which case input line 505 from the time-information apparatus carries energy in a frequency band above the speech band. This energy is derived from a carrier oscillator 506 and is modulated by modulator 507 in accordance with the time information to be telemetered. A high-pass filter 508 is employed to eliminate any time-information frequency components which may lie within the speech frequency bands.

I term the pulse appearing on lead 137 a "reference pulse." This reference pulse is first amplified in reference pulse amplifier 509 and is thereafter used to control multivibrator 510. In accordance with the preferred embodiment of my invention, motor 129 (Fig. 1) operates at an average speed of 3600 revolutions per minute, and the ratio of gear 128 to gear 129 is 1:3. This causes scanning member 117 to rotate at about 1200 revolutions per minute. Reference pulses, being induced in pickup coil 136 once in each revolution, therefore have a separation of $\frac{1}{1200}$ minute or 0.05 second. Multivibrator 510 consequently operates at a repetition rate of ten cycles per second. The output of multivibrator 510 is fed to gate circuit 511.

An "hour pulse" is induced in coil 118 (Fig. 1) each time coil 118 is carried past magnet 114 by scanning member 117. This pulse is conveyed by way of slip ring 120, brush 122 and lead 144 to hour pulse shaper-clipper 512. Similarly, the "minute pulse" generated at each passage of pickup coil 119 past magnet 115 is conveyed via slip ring 121, brush 123 and lead 145 to minute pulse shaper-clipper 513. The outputs of shaper-clippers 512 and 513 are combined in mixer-limiter 514. The combined hour and minute pulses are fed to gate circuit 511, as are the indicia pulses appearing on lead 143. The output of the gate circuit is used to modulate energy from carrier oscillator 506 as previously explained.

Where seconds information is to be telemetered in a system, involving clock 101 or its equivalent, seconds generator 502 may be employed. The pulse generated in clock 101 by contacts 110 during the 59th second of each minute is conveyed via lead 111 to sawtooth generator 516, where it is used for synchronization. The magnitude of the resulting sawtooth, which of course has a frequency of one cycle per minute, is increased in amplifier 517 and fed to trigger circuit 518. Combined with the output of amplifier 517 is a sawtooth having a repetition rate of 20 cycles per second, this sawtooth being furnished by sawtooth generator 519. The latter is synchronized by reference pulses from clipper-amplifier 509. As previously pointed out, the reference pulses occur once in each revolution of scanning member 117, or at a repetition rate of 20 pulses per second.

The output of trigger circuit 518 is differentiated by differentiator circuit 520, the output of the latter thereupon being shaped in clipper circuit 521 to form a "seconds pulse." This seconds pulse is fed to mixer-limiter 514, where it is combined with the hour and minute pulses.

The waveforms encountered in various portions of the block diagram in Fig. 5 are shown in Fig. 6. Two complete scanning periods are shown, each occupying, in the embodiment shown, 0.05 second. Waveform 601 shows a typical position within the scanning period of the minute-hand pulse picked up by coil 119, this pulse therefore appearing at the input of minute pulse clipper-shaper 513. Similarly, waveform 602 shows a typical position of the hour-pulse within the scanning period. After shaping in unit 513, waveform 601 is changed to waveform 603, while shaping of waveform 602 in unit 512 produces waveform 604. A typical output of seconds generator 502 is shown by waveform 605.

After mixing in unit 514, waveforms 603–605 are combined to form waveform 606. It is to be understood that the positions of the minute-, hour-, and second-hand pulses within the scanning period of 0.05 second are proportional to the time of day relative to the basic 24-hour period, as shown by the minute and hour hands of the clock and as derived from seconds generator 502.

The indicia pulses appearing on lead 143 are shown by waveform 607 while the reference pulses appearing on lead 137 are illustrated in waveform 608. Waveform 608, after shaping in unit 509, becomes the waveform shown at 609. Since waveform 609 is used to control multivibrator 510, the waveforms emerging from the latter unit are those shown by waveforms 610 and 611. The waveform supplied from differentiator-clipper 515 is seen at 612.

According to the present embodiment of my invention, the "hand pulses" alternate in the transmission sequence with the indicia pulses, the alternation being supplied by gate circuit 511 under the control of waveforms 610 and 611 from multivibrator 510. Therefore the combined hand-pulse and indicia information appears as in waveform 613 at the input to modulator 507. The carrier energy modulated in accordance with waveform 613 consequently appears as in waveform 614, and it is this waveform which is recorded by unit 503 in this embodiment of my invention.

For a further explanation of the operation of the apparatus shown by the block diagram of Fig. 5, reference may be had to the detailed circuit diagram given in Fig. 7. In the latter figure, dashed lines have been drawn around various portions of the circuit to indicate those components which comprise the various blocks of Fig. 5; it is to be understood that these dashed lines are not intended to represent shielding or mechanical linkage.

Reference pulses comprising waveform 608 and appearing on lead 137 are first increased in amplitude by means of input transformer 701 of unit 509, after which they are applied to the grid 702 of vacuum tube 703. Resistor 704 to ground provides proper grid loading, while resistor 705, by-passed by capacitor 706, biases tube 703 virtually to cut off. The output of this stage is therefore clipped, as indicated by waveform 609, and appears across plate load resistor 707. This waveform is applied to multivibrator circuit 510 and also to differentiator-clipper 515.

Multivibrator 510 is seen to be a symmetrical type employing triode tubes 708 and 709. Each of these has a plate ersistor (710 and 711 respectively), a cross-coupling capacitor (712 and 713 respectively), a cathode resistor (714 and 715 respectively) and a grid voltage divider (resistors 716, 717 and 718, 719, respectively). This multivibrator is of the bistable type, and changes state only when the pulses shown in waveform 609 are impressed on their plate supply circuit from the output of reference pulse clipper amplifier 509. The voltages appearing across cathode resistors 714 and 715 are both square waves, but are of opposite phase, being indicated by waveforms 610 and 611 respectively. I employ the term "square wave" in this specification in its commonly accepted sense, meaning a waveform having substantially square corners.

The operation of multivibrator 510 is as follows: Assume that when the circuit is turned on, tube 708 is conducting. When a negative pulse (waveform 609) is applied to the low-potential end of resistor 711, it passes through capacitor 713 and resistor 716 to grid 720 of tube 708. This negative pulse on the grid decreases the plate current of tube 708. The decreased plate current results in a lowered drop across resistor 710, thereby increasing the potential at plate 721 of tube 708. This increased potential is passed through capacitor 712 and resistor 718 to raise the voltage on grid 722 of tube 709. This causes tube 709 to conduct. The increase plate current through tube 709 causes a greater drop across resistor 711, and this decreased potential is transferred to grid 720 as previously outlined, thereby accelerating the transfer of conduction status from tube 708 to tube 709. When tube 709 is fully conductive, a quiescent state obtains until the next pulse of waveform 609 is received from reference pulse clipper-amplifier 509. The circuit thereafter alternates the conducting state between tubes 708 and 709 as subsequent pulse are received. Since the circuit is of symmetrical configuration, the explanation would be equally applicable had tube 709 been conducting when the circuit is first turned on.

Square wave 610 appears across resistor 714 while 611 appears across resistor 715. The latter waveform has greater amplitude than the former because resistor 715 is larger than resistor 714. Square waves 610 and 611 are directly coupled to cathodes 724 and 725, respectively, of tube 726. The plates of tube 726 are connected in parallel to load resistor 727. Grid 727 of tube 726 is connected to lead 143, upon which appear the indicia pulses induced in pickup coils 138 and 139. Resistor 728 and capacitor 729 form a filter which reduces the noise level in the indicia circuit. The second input grid 730 is fed from gain control 731, which in turn is fed from mixer-limiter circuit 514.

Circuit 514 cannot easily be separated diagrammatically from circuits 512 and 513, and hence has been represented within a single dashed rectangle, including the latter two circuits. However, the operation of the functional blocks shown will be apparent from the following description.

Clipped seconds pulses (waveform 605) arriving from unit 521 are applied across resistor 732. Hour pulses (waveform 602) appearing on lead 144 are increased in amplitude by transformer 733 and are differentiated through the action of transformer 733, capacitor 734 and resistor 735. Similarly, minute pulses (waveform 601) appearing on lead 145 are increased in amplitude by transformer 736, and are differentiated through the action of transformer 736, capacitor 737 and resistor 738.

The pulses resulting from the two differentiating processes are symmetrical and considerably sharper than the input pulses delivered from the pickup coils 118 and 119. This can be seen in Fig. 8, where waveform 801 represents the flux cut by pickup coil 118 as it passes magnet 114. Waveform 802 represents the induced voltage, the latter being the derivative of the flux waveform 801. The differentiation performed by capacitor 734 and resistor 735 thus produces waveform 803, which has a single sharp downward point. The final waveform of Fig. 8, 804, is produced by the clipping action of diode 739 shunting resistor 735. Similar waveforms obtain for the minute pulses, in which case the clipping action is performed by diode 740. The mixing function of unit 514 is accomplished by connecting resistors 732, 735 and 738 in series. Output may therefore be taken from adjustable tap 741 of resistor 738 and fed through coupling capacitor 742 to the input resistor 731 of multivibrator circuit 511.

The use of separate clipper diodes forms a part of my invention because the obvious way of clipping is to use a single diode across resistor 731. The latter arrangement results in a loss of hand identity as the hand pulses approach time coincidence, i. e., as the hands of the clock approach an overlapping condition. Overlap occurs once an hour, and loss of hand identity would make it impossible to tell time exactly. The loss of identity occurs when positive portions of the differentiated hour hand pulse (cf. waveform 803) cancel negative portions of differentiated minute hand pulses, and vice versa. Subsequent clipping, as of the output across resistor 731, would have no effect on this deleterious action. Individual clipping in accordance with my invention as disclosed above, however, eliminates all positive portions of the differentiated hand-pulse waveforms and so cancellation problems cannot occur.

Further consideration of the problems involved in unit 514 shows that time coincidence of the hands would ordinarily result in a single enlarged pulse, due to the adding of the individual clipped hand pulses (cf. waveform 804). An extra diode across the output of resistor 731 would limit the amplitude of this pulse, but would cause excessive broadening and hence loss of accuracy in telling time. I overcome these difficulties in accordance with my invention by proportioning the constants of the circuit such that diode 740 conducts and diode 739 is cut off when both hour- and minute-hand pulses are present, but only then.

The situation is indicated in the equivalent circuit, Fig. 15. It is assumed for analysis that the back resistance of the diodes is infinite and their forward resistance is zero. The diodes have been therefore drawn as open or closed switches, depending upon whether they are considered in the non-conducting or conducting states, respectively.

Let $E_1$ = voltage due to minute hand pulse,
$E_2$ = voltage due to hour hand pulse,
$R_1$ = equivalent series impedance of minute hand pulse source,
$R_2$ = equivalent series impedance of hour hand pulse source,
$R_3$ = equivalent output impedance of circuit,
$E_{01}$ = component of output voltage due to $E_1$,
$E_{02}$ = component of output voltage due to $E_2$.

$E_{01}$ may be found by considering the case where diode $D_1$ is conducting and diode $D_2$ is not. Thus $$E_{01} = \frac{E_1 R_3}{R_1 + R_3}$$

Similarly, $E_{02}$ may be found by considering the case where diode $D_2$ is conducting and $D_1$ is not. Then $$E_{02} = \frac{E_2 R_3}{R_2 + R_3}$$

For a desired $$\frac{E_{02}}{E_{01}} = A = \frac{E_2 R_3}{R_2 + R_3} \div \frac{E_1 R_3}{R_1 + R_3} = \frac{E_2}{E_1} \frac{(R_1 + R_3)}{(R_2 + R_3)}$$

or $$\frac{E_2}{E_1} = A \frac{(R_2 + R_3)}{(R_1 + R_3)} \qquad (1)$$

If $i_2 \geq i_1$ (the situation shown in Fig. 15), $$\frac{E_2}{R_2 + R_3} \geq \frac{E_1}{R_1}$$

and hence $$\frac{E_2}{E_1} \geq \frac{R_2 + R_3}{R_1} \qquad (2)$$

From (1) and (2), $$A \frac{R_2 + R_3}{R_1 + R_3} \geq \frac{R_2 + R_3}{R_1}$$

from which $$R_3 \leq R_1 (A - 1) \qquad (3)$$

$R_2$ may then be determined from (1). In the particular circuit embodiment shown in Fig. 7, the constants may be chosen to produce substantially the equivalent values obtained from the formulas.

It will be observed that the arrangement shown provides negative limiting as well as positive clipping, and hence is widely useful in the electrical arts. I particularly wish to point out that the circuit I have shown and explained is not limited to pulse inputs; the inputs may be continuous waveforms, including direct currents. In the embodiment shown, an amplitude ratio of minute pulses to hour pulses of 2 to 1 results in a superimposed pulse amplitude less than 5% greater than the minute hand pulse alone.

From the foregoing it is seen that one input of gate circuit 511 comprises indicia pulses (waveform 607), while the other input comprises waveform 606, the combined hour, minute and second hand (where used) pulses. The square waveforms of opposite polarity on the cathodes of multivibrator tubes 708 and 709 (waveforms 610 and 611, respectively) cause the two sections to conduct alternately, and therefore the output taken from the plates through coupling capacitor 743 and isolating resistor 744 is the combined waveform 613. Waveform 613 is applied to the grid 745 of tube 746 in modulator unit 507. Cathode bias is provided for this tube by resistor 747, which is by-passed by capacitor 748.

Carrier-frequency energy from carrier oscillator 506 is also applied to grid 745. Oscillator 506 is preferably the conventional RC type indicated but may be any other type capable of oscillating at the desired frequency. An explanation of RC oscillators is given in F. E. Terman, "Radio Engineering," McGraw-Hill Book Company, Inc., New York, N. Y., 1937; p. 437, and hence will not be repeated here. In the present embodiment of my invention, the oscillator may operate at approximately 6.7 kc./sec., for example.

Some of the output from the reference pulse clipper-amplifier 509 is passed through differentiator-clipper 515 to the modulator unit 507. Differentiator-clipper 509 comprises a diode 752 which I have shown as being of the crystal type, and a differentiating network comprising capacitor 753 and resistor 754. The differentiated output, waveform 612, is applied to the grid 745 of tube 746 through isolating resistor 755. Inclusion of waveform 612 in the information stored on the recording medium improves the squareness of the waveform recovered upon playback.

Diode 749 is connected from grid 745 to ground. This diode and the 5 kc./sec. high-pass filter, 508, perform the functions of a modulator. Diode 749 removes virtually all of the negative portions of the mixed signals supplied by oscillator 506 and gate 511, whereupon the resulting asymmetrical waveform, together with the low-frequency components of waveform 613, is amplified in tube 746. The amplified output appearing at the plate of tube 746 is impedance-coupled, by means of inductor 750 and capacitor 751, to 5 kc./sec. high-pass filter 508. The latter unit removes undesired low-frequency components. The waveform resulting is 614, and contains all of the time information to be telemetered. This waveform is combined with the speech information placed on channel 504 and both are stored by recorder 503.

*Seconds generator*

The purpose of seconds generator 502 is to produce a pulse once in each revolution of scanning member 117. In other words, the output pulse of trigger circuit 518 must occur within the total scanning period of 0.05 second at a time which is proportional to the time elapsed from the start of the then-present minute.

The voltage pulse derived from contacts 110 of clock 101 is shown in Fig. 10 as waveform 1001. Contacts 110, it will be recalled, close at the start of the fifty-ninth second and remain closed until the end of the minute. The closing of contacts 110 applies positive voltage from resistor 910 to plate 901 of capacitor 902, momentarily causing the other plate, 903, to assume a positive potential also. Positive voltage consequently appears on plate 905, to which grid 904 is connected, of tube 906. Under these conditions, tube 906 conducts, thereby allowing capacitor 902 to charge through resistor 910, contacts 110, lead 111, capacitor 902, tube 906, and resistor 908 to ground. It will be noted that cathode 907 of tube 906 is biased by positive voltage obtained from a voltage divider comprising resistors 908 and 909.

When contacts 110 are closed and capacitor 902 has been charged, plate 903 of capacitor 902 has a negative charge with respect to plate 901. This negative charge, being applied plate 905 and grid 904, effectively cuts off tube 906. At the end of the minute, positive voltage is removed from plate 901 of capacitor 902 due to the opening of contacts 110. Since tube 906 is now cut off because of the negative charge on plate 904, the charge on capacitor 902 leaks off through a path including resistor 911, capacitor 903, resistor 912, resistor 913, and resistor 908. Resistors in this group are of high total resistance, and the time constant of the RC circuit involved is on the order of more than a minute. Thus it is seen that the voltage across capacitor 902 furnishes a 1 C. P. M. sawtooth voltage. This voltage, waveform 1002, is taken from the junction of resistors 912 and 913, and so forms the output of 1 c./min. sawtooth generator 516.

Waveform 1002 is applied to grid 914 of tube 915 in amplifier 517. Because of the long time-constant involved, amplifier 517 must be direct-coupled throughout. However, this circumstance means that variations in the voltage applied to filament 921 of tube 515 will cause variations in the emission current of cathode 922. According to a feature of my invention, I supply voltage to filament 921 from power source 923 over leads indicated by X—X. Power source 923 is arranged to supply B+ voltage as well as filament voltage to the time translator, both voltage supplies being derived from the same A.-C. main via line 924. To provide adequate stability in other circuits of the time transmitter, I provide an electronic voltage regulator 925. This regulator is of conventional construction and its operation may be understood from a description given in J. G. Brainerd (ed.), "Ultra-High-Frequency Techniques," D. Van Nostrand Company, Inc., New York, N. Y., 1942; p. 73. In accordance with my invention, I provide resistors 926 and 927 connected in series from the input to the output of the regulator, and I supply the plate of tube 915 from the junction of these resistors.

Suppose, for example, that the A.-C. voltage supplied to power supply 923 increases. Filament voltage on leads X—X increases, as does the input to regulator 925. Cathode emission increases due to the increased filament voltage, and the voltage at the plate of tube 915 consequently decreases due to the larger drop across plate load resistor 919. If resistor 919 were connected to the input of regulator 925, the increase in B+ voltage would be greater than the drop due to increased filament voltage; and if the connection were made to the output of the regulator, there would be no compensatory effect at all. But supplying resistor 919 from the junction of resistors 926 and 927, and by proportioning the values of the latter two resistors, I am able to compensate exactly for increases in filament voltage. Similar reasoning shows that the same means will compensate for decreases in filament voltage also. This system of filament voltage compensation is claimed in my copending application, Serial No. 273,900, filed February 28, 1952, now United States Patent 2,710,349. The output of tube 915 is fed through resistors 916 and 917 to the grid of tube 918 in trigger unit 518. Also appearing on this grid is waveform 1005, which is coupled from unit 519 through resistors 929 and 930 in series to the junction of resistors 916 and 917. A portion of the output waveform of sawtooth generator 519 is fed through capacitor 931 directly to tube 918, in order to improve the high frequency response of waveform 1005.

Unit 519 is a conventional cathode-coupled multivibrator operating at 20 cycles per second. This circuit, being of conventional design, will not be described here. (For a complete description of its operation, see M. S. Kiver, "Television Simplified," D. Van Nostrand Company, Inc., New York, N. Y., 1948; p. 257.) The 20 c./sec. multivibrator is governed by waveform 609 derived, by way of coupling capacitor 927 and isolating resistor 928, from reference pulse clipper-amplifier 509.

Trigger 518 comprises a conventional astable multivibrator circuit of the Schmitt type; when its bias level is exceeded, it changes from one state to another for a length of time determined by the time constants involved. The operation of the Schmitt circuit is described in B. Chance (ed.), "Waveforms," vol. 19 of the MIT Radiation Laboratory Series, McGraw-Hill Book Company, New York, N. Y., 1949, p. 165.

Since trigger 518 cannot fire until its bias level is exceeded, it is apparent that a trigger pulse will be generated only when the combined 1 c./min. and 20 c./sec. sawtooth voltages (waveform 1003) are greater than the bias voltage. This may be seen with greater clarity in another portion of Fig. 10; here waveform 1004 is a representation to a different scale of waveform 609 in Figure 6. Waveform 1005 is the 20 c./sec. sawtooth output of unit 519. It will be noted that the time scale is considerably expanded from that shown for waveform 1003 because the latter precludes representation of individual sawteeth of the 20 c./sec. sawtooth generator.

Waveform 1005 illustrates in detail how each sawtooth of the 20 c./sec. sawtooth generator crosses the trigger level line of trigger 518. However, it will be noted that by comparison with waveform 1003 that each sawtooth starts at a lower level than the preceding one in the series, due to the presence of the 1 c./min. sawtooth. In other words, each sawtooth crosses the trigger level line at a time within its own 0.05-second interval later than the preceding sawtooth crossed in its own 0.05-second interval. Since each crossing of the trigger level line by individual sawtooth of waveform 1005 causes firing of trigger 518, it is apparent that the output of the latter unit, waveform 1006, consists of succeedingly latter square waves until the end of the minute is reached and the process is repeated.

Square waves of waveform 1006 are differentiated by differentiator 520, which consists of capacitors 933 and 934 and resistors 935 and 936. Waveform 1007 therefore results. Positive peaks are removed from waveform 1007 through the action of clipper diode 937 in clipper 521, thus furnishing waveform 9008. The latter waveform comprises the desired seconds pulses, shown earlier on a different scale as waveform 605. These negative seconds pulses, since they occur at the trailing edge of the square waves in waveform 1006, appear at increasingly later times in each 0.05-second interval as a given one-minute period is traversed.

Time translator

The information stored on recorder 503 may be recovered at a later time, or in another place, through the use of recorder play-back unit 1101. Speech information, if present, may be removed from the output of unit 1101 via lead 1102 and subsequently amplified and converted into audible sound. Since recorder play-back units, amplifiers and loudspeakers useful in accomplishing the foregoing steps are well known to those skilled in the art, and since detailed knowledge of them is not necessary to an understanding of my invention, no discussion of these items is regarded as essential to this specification.

In addition to speech information, time telemetering data may be recovered by unit 1101. The remaining apparatus indicated in Figure 11 functions to present this data on the display of a cathode-ray tube in the manner described in connection with Fig. 2.

Time data from recorder play-back unit 1101 is first passed through the 5 kc./sec. high-pass filter 1103 to eliminate the frequency components of speech. The time data is amplified in input amplifier 1104 and then demodulated. The output of the demodulator, waveform 1202, is seen to comprise a square wave with a superimposed complex wave, the latter composed of waveform elements short compared to the period of the square wave.

Waveform 1202 is amplified in unit 1106, and a portion of the output is applied directly to radial deflection electrode 1107 of cathode-ray tube 1108. A second portion of the output is fed to phase-splitter 1109. The two voltages of opposite phase (waveforms 1204 and 1205) emerging from the latter circuit are used to drive a self-biased gate, unit 1110.

Self-biased gate 1110 developes a pip at each change-of-potential point in waveforms 1204 and 1205. The resulting waveform, 1206, is amplified and inverted by reference-pulse amplifier 1111. The waveform at this point is 1207, and is used to trigger 20 c./sec. multivibrator 1112. The output waveform of the latter unit is 1208. Waveform 1208 is filtered in unit 1113 to remove all but its lowest-frequency component. The resulting sine wave is then split into two out-phased signal waveforms and fed to vertical deflection amplifier 1114 and to horizontal deflection amplifier 1115. Since deflection amplifiers 1114 and 1115 employ push-pull circuits, each of them furnishes a pair of output voltages which are 180° out of phase with each other. Furthermore, the voltages involved are in phase quadrature; that is, one of the four voltages reaches a peak every 90°. By applying these voltages to the electrostatic deflection plates of cathode-ray tube 1108, a circular sweep is produced.

From the foregoing explanation, it will be apparent that the electron beam of tube 1108 makes a single circular sweep during each period of 0.05 second duration, corresponding to the time required for scanning member 117 to make a single revolution. However, waveform 1202, which is the waveform applied to radial deflection electrode 1107, contains hand information and indicia information during alternate 0.05-second periods. Moreover, the indicia information is carried at a lower voltage level than the hand information. The electron beam of tube 1108 therefore traces out hand-position information on an inner circle of smaller diameter during a first period of 0.05 second, and then traces out indicia information on an outer circle of larger diameter during a second 0.05-second period. This sequence of events then repeats.

For a detailed consideration of the circuitry involved in the time translator circuit, reference may be had to the complete circuit wiring diagram formed by laying Fig. 14 at the right of Fig. 13 with corresponding lines in alignment. In this schematic wiring diagram, recorder play-back unit 1101 and high-pass filter 1103 have again been represented as blocks, inasmuch as conventional apparatus will perform the functions indicated. The high-pass filter may have a lower cutoff frequency of 5 kc./s. to correspond with the value employed for 5 kc./s. high-pass filter 508 in the time transmitter.

The output of high-pass filter 1103 is fed to adjustable resistor 1301. Tap 1302 of this resistor is connected to the grid of tube 1303 in amplifier 1104. This amplifier employs a conventional circuit configuration, tube 1303 being provided with cathode resistor 1304, bypass capacitor 1305, plate load resistor 1306 and output coupling capacitor 1307. The output of input amplifier 1104 is fed to the grid of tube 1308 in demodulator 1105.

Tube 1308 is employed as a phase inverter of the split-cathode plate-load type. Resistor 1309 is the plate load while resistor 1310 is the cathode load. Resistor 1311 provides sufficient cathode bias for tube 1308, and resistor 1312 provides a return path for its grid. Output from the plate of tube 1308 is coupled through capacitor 1313 to resistor 1314, the voltage developed across resistor 1314 being fed to demodulator tube 1315. In similar fashion, output appearing across cathode resistor 1310 is transferred through coupling capacitor 1316 to resistor 1317. The voltage developed across resistor 1317 is then applied to demodulator tube 1318. Since the voltages developed at the cathode and plate of tube 1308 are 180° out of phase, diodes 1315 and 1318 provide full-wave rectification of waveform 1201. The demodulated waveform, 1202, appears across the common cathode load resistor 1319. Full wave rectification is highly desirable in the time translator because there are relatively few cycles of carrier occurring during a given indicia or hand pulse.

Waveform 1202 is passed through a low-pass filter consisting of resistors 1320 and 1321 and capacitors 1322, 1323, and 1324 to the grid of cathode follower tube 1325. Output of the latter is developed in cathode resistor 1326, from which it is transferred to the grid of tube 1327. Use of the cathode follower avoids loading of demodulator tubes 1315 and 1318.

The cathode of tube 1327 has a positive bias developed by a voltage divider comprising resistors 1328 and 1329. The output of this stage is taken from tap 1330 of plate resistor 1331 and is coupled through capacitor 1332 to load resistor 1333. The voltage developed across resistor 1333 is waveform 1203, and is applied to radial deflection electrode 1107 of cathode-ray display tube 1108.

Voltage derived from tap 1330 is also fed through capacitor 1334 to phase-inverter 1109. This comprises triode vacuum tube 1335 with its accompanying plate load resistor 1336, cathode resistors 1337 and 1338, and grid resistor 1339. Output developed across plate resistor 1336 is coupled through capacitor 1340 to load resistor 1341, while output voltage developed in cathode load resistor 1338 is coupled through capacitor 1342 to load resistor 1342. Capacitor 1344 is shunted from the output of the cathode load resistor to ground in order to assist in pulse shaping.

The voltage appearing across resistor 1341 is waveform 1204. This waveform is fed to the plate of diode 1345 in self-biased gate circuit 1110. Similarly, the voltage appearing across resistor 1343 is waveform 1205. It is sent to the plate of diode 1346 in the self-biased gate circuit 1110 also. The output of diodes 1345 and 1346 is taken from the cathodes of these tubes in parallel and is fed to series-connected resistors 1347 and 1348.

Phase splitter 1109 and self-biased gate circuit 1110 cooperate to eliminate all but the upper tips of waveform 1205 and the lowermost tips of waveform 1204, thus leaving waveform 1206. This is done as follows: When waveform 1202 is applied to the grid of the phase inverter tube 1336, the inverse waveform, 1203, is produced at the plate. The plate side of capacitor 1340 then has a positive potential, and the output side of this capacitor attempts to achieve this potential. The plate of diode 1345 is now positive, and consequently draws current through resistors 1347 and 1348. This continues until the charge on the output side of capacitor 1340 is neutralized. Since there is no positive voltage on the plate of diode 1345, diode 1345 consequently cuts off. The voltage developed across series resistors 1347 and 1348 as a result of the current flow through diode 1345 thus amounts only to a single pulse which occurs at the leading change-of-potential edge of waveform 1203. When negative polarity appears at the trailing change-of-potential edge of waveform 1203, capacitor 1340 discharges through resistor 1341. The discharge is slower than the charging process through diode 1345 because resistor 1341 has considerably higher resistance than resistors 1347 and 1348 in series.

A similar action occurs when waveform 1202 appears at the cathode of tube 1335. Diode 1346 then causes a similar pulse of current to pass through resistors 1347 and 1348 at the leading change-of-potential point in waveform 1202. It will be noted that the output pulses from diode 1345 occur at 0.1 second intervals, since the times when waveform 1202 drops below the clipping level occur only once in every other scanning period. Similarly, the pulses resulting from current flow in diode 1346 occur only once every 0.1 second, but these are displaced from the pulses from diode 1345 by 0.05 second. There is consequently a pulse at the start of every 0.05-second period, as shown by waveform 1206, and it occurs at the same relative time as a reference pulse. In this way, waveform 1206 represents a reconstruction, except for polarity, of waveform 609.

The reconstructed reference pulses appearing across resistor 1348 are coupled through capacitor 1349 to the grid of vacuum tube 1350 in reference pulse amplifier 1111. This amplifier is a conventional cathode-biased amplifier having a grid return resistor 1351, a plate load resistor 1352, a cathode bias resistor 1353 and a cathode bypass capacitor 1354. Output is coupled from plate load resistor 1352 through capacitor 1355 to the 20 c./sec. multivibrator, 1112, appearing in Fig. 14. Unit 1112 is a conventional type of multivibrator, its operation being described in F. E. Terman, "Radio Engineering," McGraw-Hill Book Company, New York, N. Y., 1947; p. 588. As explained previously, the output of this circuit is waveform 1208.

Waveform 1208 is coupled through capacitor 1401 to resistors 1402, 1403 and 1404. Resistors 1402 and 1403 are dual potentiometers having a common operating shaft. Through their use, the phase of the output voltage from the 20 c./sec. multivibrator 1112 may be adjusted while maintaining relatively constant amplitude. In practice, the control comprising elements 1402 and 1403 is adjusted so that the cross-over from inner to outer sweep trace (see 205 in Fig. 2) occurs at the 24 o'clock position on the cathode-ray tube display. In other words, the zero position of a hand is made to register with the "zero" one of the indicia; this advantage is retained regardless of the orientation of cathode-ray tube 1108, which might accidentally become rotated in its mounting.

Capacitor 1401, together with the lower portion of resistor 1403 and the entirety of resistor 1404, form a high-press filter which eliminates low-frequency components resulting from changes in the speed of scanner member 117, which would cause a shift of the position of the display on the screen of tube 1108. The voltage which appears at the upper end of resistor 1402 is filtered by a low-pass filter composed of resistors 1405, 1406 and 1407, and capacitors 1408 and 1409. This filter eliminates harmonics of the fundamental frequency of the output from the 20 c./sec. multivibrator. Resistor 1407 is made adjustable to allow the amplitude of the sweep voltage supplied to cathode-ray tube 1108 to be changed without appreciably affecting its phase.

Voltage from resistor 1407 is fed through isolating resistor 1410 and coupling capacitor 1411 to the grid of amplifier tube 1412 in unit 1113. Capacitor 1411 and resistor 1415 form a high-pass filter performing a function similar to capacitor 1401 and resistors 1403 and 1404. Tube 1412 is a cathode-biased amplifier stage having a plate load resistor 1413, an unbypassed cathode resistor 1414 to provide wide response, and a plate-shunting capacitor 1440.

Grid return is through resistor 1415. Voltage taken from the plate of tube 1412 is passed through a twin-T filter comprising capacitor 1416, 1417, and 1418, and resistors 1419, 1420, and 1421. The output waveform is coupled through capacitor 1422 to the grid of phase-inverter tube 1423. Some cathode output voltage developed across resistor 1424 is fed back to the grid of tube 1412 through capacitor 1425 and resistor 1426. The action of the twin-T, together with tubes 1412 and 1423 and their associated components, is that of a low-pass filter. The operation is explained in G. J. Thiessen, "RC Filter Circuits," Journal of the Acoustical Society of America, April 1945; pp. 275–279.

Output from the plate circuit of tube 1423 is fed through coupling capacitor 1427 to a first phase-splitting circuit comprising capacitor 1428 and resistor 1429 and to a second phase-splitting circuit including resistors 1430 and 1431 and capacitor 1432. These phase-splitting circuits are returned through capacitor 1433 to the upper end of cathode load resistor, because the voltage at this point differs in phase from the plate output by 180 degrees.

From the configuration of the elements in these splitting circuits, it will be seen that the voltage at point 1434 differs in phase by 180° from the phase at point 1435. The voltage at point 1436 is, of course, 180° displaced from the voltage at point 1437. Furthermore, the voltages at points 1434 and 1435 are displaced 90°, respectively, from those at point 1436, and therefore 90° in the opposite direction from those at point 1437. The waveforms involved at points 1434, 1435, 1436, and 1437 are 1211, 1212, 1209, and 1210, respectively. By feeding voltages from points 1434 and 1435 to the grids of the vertical output amplifier tube 1438 and from points 1436 and 1437 to the grids of the horizontal output amplifier tube 1439, four voltages in quadrature are made available for circular deflection of the electron beam in cathode-ray tube 1108. Both of the vertical and horizontal output amplifiers diagrammed are conventional push-pull circuits employing triodes. It is therefore felt that a detailed explanation of their operation is unnecessary.

While I have shown and described my invention as applied to a time telemetering system, and a specific embodiment thereof, other modifications will readily occur to those skilled in the art. For example, the beam of cathode-ray tube 1108 may be intensity-modulated to produce indications on the screen of the location of the hands or of the indicia, or both. Furthermore, the substitution of transistors for vacuum tubes is an obvious expedient, and I wish, in the absence of a suitable generic term, to cover the use of transistors as well as tubes by the words "electron discharge device" or "electron discharge means." I do not, therefore, desire my invention to be limited to the specific arrangement shown and described, and I intend the claims to cover all modifications within the spirit and scope of my invention.

What I claim is:

1. In a telemetering system, the combination of an index member having an axis and adapted for rotation about said axis; a first magnet mounted for rotation with said index member about said axis; a continuously-rotating scanning member; a first magnetic pickup coil mounted on said scanning member, said first pickup coil being located on said scanning member to pass said first magnet at least once in each scanning period, whereby index member pulses are induced in said first pickup coil; a second magnet mounted on said scanning member, a second magnetic pickup coil stationarily located for encounter with said second magnet at least once in each scanning period, whereby reference pulses are induced in said second coil; a cathode-ray tube having a circular sweep circuit and a radial-deflection circuit; means for synchronizing said circular sweep circuit with said reference pulses; and means for applying said index member pulses to said radial-deflection circuit thus producing on the screen of said cathode-ray tube a circular trace having a pip indicating the location of said index member relative to said scanning sequence regardless of the spatial orientation of said cathode-ray tube.

2. In a telemetering system, the combination of measuring means having spaced-apart indicia of quantity associated therewith; magnetic pickup means; a member arranged cyclically to pass said magnetic pickup means, said member having protrusions of magnetic material, said protrusions having various widths and being spaced apart by distances proportional to the spacing between corresponding ones of said indicia; means for setting up a magnetic field between said pickup means and said protrusions, whereby the reluctance of the path between said pickup means and said protrusions is varied in accordance with said spacing of said indicia and a series of pulses is generated in said pickup means, the spacing between said pulses corresponding to said spacing of said indicia and the magnitude of said pulses corresponding to the respective widths of said protrusions; a cathode-ray tube; and means acting on the electron beam of said cathode-ray tube in accordance with said pulses for indicating on the display of said cathode-ray tube both the relative positions and lengths of said indicia.

3. In a telemetering system, the combination of measuring means having spaced-apart indicia of quantity associated therewith; a generally wheel-shaped member continually rotated about an axis through said member, the circumferential edge of said member having protrusions of magnetic material thereon, every Nth one of said protrusions extending farther across said circumferential edge than others of said protrusions, yet all of said protrusions being spaced apart by distances proportional to the spacing between corresponding ones of said indicia; magnetic means having a plurality of poles and a winding on each of said poles, said windings being connected series-opposing, said magnetic means being stationarily mounted to achieve flux linkage between said poles and said protrusions as said protrusions are swept past said poles by said wheel-shaped member, thereby varying the reluctance of the path between said protrusions and said poles, and hence inducing in said windings pulses having amplitude and spacing proportional to the width and spacing respectively of the corresponding ones of said indicia; the face centers of said poles being spaced apart by a distance equal to the spacing between said Nth ones of said protrusions plus half the spacing between adjacent ones of said protrusions; cathode-ray means; a sweep circuit connected to said cathode-ray means; and means acting in accordance with said pulses on the beam of said cathode-ray means for indicating on the display of said cathode-ray means both the relative positions and lengths of said indicia.

4. In a telemetering system, the combination of measuring means having spaced-apart indicia of quantity associated therewith; a generally wheel-shaped member continually rotated about an axis through said member, the circumferential edge of said member having protrusions of magnetic material thereon, every Nth one of said protrusions extending farther across said circumferential edge than others of said protrusions, yet all of said protrusions being spaced apart by distances proportional to the spacing between corresponding ones of said indicia; magnetic means having a plurality of poles and a winding on each of said poles, said windings being connected series-opposing, said magnetic means being stationarily mounted to achieve flux linkage between said poles and said protrusions as said protrusions are swept past said poles by said wheel-shaped member, thereby varying the reluctance of the path between said protrusions and said poles, and hence inducing in said windings pulses having amplitude and spacing proportional to the width and spacing respectively of the corresponding ones of said indicia; the face centers of said poles being spaced apart by a distance equal to the spacing between said Nth ones of said protrusions minus half the spacing between adjacent ones of said protrusions; cathode-ray means; a sweep circuit connected to said cathode-ray means; and means acting in accordance with said pulses on the beam of said cathode-ray means for indicating on the display of said cathode-ray means both the relative positions and lengths of said indicia.

5. In a reluctance generator for generating pulses, the combination of a series of pulses having uniform inter-pulse spacing, every Nth one of said pulses having greater amplitude than the others of said pulses; a generally wheel-shaped member rotatable about an axis through said member; means for continuously rotating said wheel-shaped member; the circumferential region of said member having protrusions of magnetic material thereon, every Nth one of said protrusions being larger than others of said protrusions, yet all said protrusions being spaced apart by distances proportional to said inter-pulse spacing; magnetic means having a plurality of poles, each of said poles having a winding thereon and having a face, said windings being connected series-opposing, said magnetic means being stationarily mounted to achieve flux linkage between said poles and said protrusions as said protrusions are swept past said pole faces by said wheel-shaped member, thereby varying the reluctance of the path between said protrusions and said poles and hence inducing in said windings said series of pulses having amplitude and spacing proportional to the width and spacing, respectively, of the corresponding ones of said series of pulses; the face centers of said poles being spaced apart by a distance equal to the distance between said Nth ones of said protrusions plus half the spacing between adjacent ones of said protrusions, whereby the frequency component induced in said windings due to the repetition rate of said Nth pulses is canceled from the output of said windings; a cathode-ray tube having a circular sweep circuit and a radial-deflection circuit; means for causing said circular sweep circuit to operate at the rotational frequency of said wheel-shaped member; and means for applying said series of pulses to said radial-deflection circuit, thereby producing a series of radial pips on the circular trace of said cathode-ray tube, the spacing of said pips being proportional to said inter-pulse spacing, the length of every Nth one of said pulses being greater than others of said pulses.

6. In a reluctance generator for generating pulses, the combination of a series of pulses having uniform inter-pulse spacing, every Nth one of said pulses having greater amplitude than the others of said pulses; a generally wheel-shaped member rotatable about an axis through said member; means for continuously rotating said wheel-shaped member; the circumferential region of said member having protrusions of magnetic material thereon, every Nth one of said protrusions being larger than others of said protrusions, yet all said protrusions being spaced apart by distances proportional to said inter-pulse spacing; magnetic means having a plurality of poles, each of said poles having a winding thereon and having a face, said windings being connected series-opposing, said magnetic means being stationarily mounted to achieve flux linkage between said poles and said protrusions as said protrusions are swept past said pole faces by said wheel-shaped member, thereby varying the reluctance of the path between said protrusions and said poles and hence inducing in said windings said series of pulses having amplitude and spacing proportional to the width and spacing, respectively, of the corresponding ones of said series of pulses; the face centers of said poles being spaced apart by a distance equal to the distance between said Nth ones of said protrusions minus half the spacing between adjacent ones of said protrusions, whereby the frequency component induced in said windings due to the repetition rate of said Nth pulses is canceled from the output of said windings; a cathode-ray tube having a circular sweep circuit and a radial-deflection circuit; means for causing said circular sweep circuit to operate at the rotational frequency of said wheel-shaped member; and means for applying said series of pulses to said radial-deflection circuit, thereby producing a series of radial pips on the circular trace of said cathode-ray tube, the spacing of said pips being proportional to said inter-pulse spacing, the length to every Nth one of said pulses being greater than others of said pulses.

7. In a telemetering system, the combination of a movable index member; a scanning member; means for cyclically passing said scanning member past said movable index member; means for generating a pulse at each passage of said scanning member past said movable index member; a cathode-ray tube having a signal circuit and a circular sweep circuit; means for applying said pulse to said signal circuit; and means for causing said circular sweep circuit to operate at the frequency of said first-named means, said last named means comprising means synchronized by said pulse for generating a square wave, filter means operating to pass only the fundamental frequency of said square wave, and phase-splitting means operating to generate a voltage from the output waveform of said filter means for circularly deflecting the beam of said cathode-ray tube.

8. In a telemetering system, the combination of a rotating member; means for generating a first pulse at a point in each revolution of said rotating member; a cathode-ray tube; means for generating a first square wave having a period twice as long as the rotational period of said rotating member, said means for generating said first square wave being synchronized by said first pulse; means for generating a second pulse at the change-of-potential points of said first square wave; means for generating a second square wave, said second square wave having half the period of said first square wave, said second square-wave generating means being synchronized by said second pulse; filter means operating to pass only the fundamental frequency of said second square wave; and phase-splitting means operating to generate voltages from the output waveform of said filter means for circularly deflecting the beam of said cathode-ray tube.

9. In a telemetering system, the combination of a rotating member; means for generating a first pulse at a point in each revolution of said rotating member; means for generating a first square wave, said means for generating a said first square wave being synchronized by said first pulse; means for storing said first square wave on a recording medium; means for later recovering said first square wave from said recording medium; means for generating a second pulse at the change-of-potential points of said first square wave; means for generating a second square wave, said last-named means being synchronized by said second pulse; filter means operating to pass only the fundamental frequency of said second square wave; a cathode-ray tube; and phase-splitting means operating to generate voltages from the output waveform of said filtering means for circularly deflecting the beam of said cathode-ray tube.

10. In a telemetering system, the combination of an index member having an axis and adapted for rotary movement about said axis, said index member having associated therewith a scale of indicia for indicating quantity; a magnet mounted for rotation about said axis with said index member; a continuously rotating scanning member; a magnetic pickup coil mounted on said scanning member, said pickup coil being located on said scanning member to pass said magnet at least once in each scanning period, whereby index member pulses are induced in said coil; a stator; a rotor for said stator coupled for rotation to said scanning member, said rotor having a number of protrusions made of magnetic material around its circumference proportional to the number of said indicia in said scale; means for setting up a magnetic field between said rotor and said stator, thereby inducing indicia pulses in said stator; a cathode-ray tube having a circular sweep circuit and a radial deflection circuit; means for causing said circular sweep circuit to operate at the rotational frequency of said scanning member; and means for applying to said radial deflection circuit said index member pulses and said indicia pulses during alternate rotations of said scanning member, thus producing on the screen of said cathode-ray tube a circular presentation including pips representing said indicia and a pip representing the position of said index member relative to said scale.

11. In a telemetering system, the combination of an index member having an axis and adapted for rotary movement about said axis, said index member having a scale of indicia associated therewith for indicating quantity; magnetic means mounted for rotation with said index member about said axis; a continuously rotating scanning member; magnetic pickup means mounted on said scanning member, said magnetic pickup means being located on said scanning member to pass said magnetic means at least once in each scanning period of said scanning member; whereby index member pulses are induced in said magnetic pickup means; a stator; a rotor for said stator coupled for rotation to said scanning member, said rotor having a number of protrusions made of magnetic material around its circumference proportional to the number of said indicia in said scale; means for setting up a magnetic field between said stator and said rotor, thereby inducing indicia pulses in said stator; means for generating a square wave having a period equal to the scanning period of scanning member; means for superimposing said index member pulse on one polarity of half-cycles of said square wave and for superimposing said indicia pulses on the other polarity of half-cycles of said square wave; a cathode-ray tube having a circular sweep circuit and a radial deflection circuit; means for synchronizing the period of said circular sweep circuit with the period of said square wave; and means for applying said square wave with said superimposed index member pulses and indicia pulses to said radial deflection circuit, whereby there are displayed on the screen of said cathode-ray tube concentric circles, one of said circles carrying an index member pip corresponding in position to the position of said index member relative to said scale, and the other of said circles carrying indicia pips having the relative spacing of said indicia.

12. In a telemetering system, the combination of an index member having an axis and adapted for rotation about said axis, said index member having a scale of indicia for indicating quantity; a first magnet mounted for rotation with said index member about said axis; a continuously rotating scanning member; a first magnetic pickup coil mounted on said scanning member; said first pickup coil being located on said scanning member to pass said first magnet at least once in each scanning cycle, whereby index member pulses are induced in said first pickup coil; a stator; a rotor for said stator coupled for rotation to said scanning member, said rotor having protrusions of magnetic material around its circumference, the number of said protrusions being proportional to the number of said indicia in said scale; means for setting up a magnetic field between said rotor and said stator, thereby inducing indicia pulses in said stator; a second magnet mounted on said scanning member; a second magnetic pickup coil, said second coil being stationarily located for encounter with said second magnet at least once in each scanning period, whereby reference pulses are induced in said second coil; a cathode-ray tube having a circular sweep circuit and a radial deflection circuit; means for synchronizing said circular sweep circuit with said reference pulses; and means for applying to said radial deflection circuit said index member pulses and said indicia pulses during alternate rotations of said scanning member, thus producing on the screen of said cathode-ray tube a circular trace having indicia pips representing said scale of indicia and an index member pip representing the position of said index member relative to said scale, said index member pip indicating the location of said index member relative to said scanning period, regardless of the spatial orientation of said cathode-ray tube.

13. In a telemetering system, the combination of an index member having a scale of indicia for indicating quantity and pivoted about an axis; a first magnet mounted for off-axis rotation with said index member; a continuously-rotating scanning member having a scanning period dependent on the speed of rotation of said scanning member; a first magnetic pickup coil mounted on said scanning member; said first pickup coil being located on said scanning member to pass said first magnet at least once in each said scanning cycle, whereby index member pulses are induced in said first pickup coil; a stator; a rotor for said stator coupled for rotation to said scanning member, said rotor having protrusions of magnetic material around its circumference, the number of said protrusions being equal to the number of said indicia in said scale; means for setting up a magnetic field between said rotor and said stator, thereby inducing indicia pulses in said stator; a second magnet mounted on said scanning member, a second magnetic pickup coil, said second coil being stationarily located for encounter with said second magnet at least once in each said scanning period, whereby reference pulses are induced in said second coil; a first square-wave generator keyed alternately on and off by successive ones of said reference pulses; a first gate circuit keyed by said first square-wave generator and having inputs of said index member pulses and said indicia pulses, whereby the output waveform of said first gate circuit comprises alternate periods of index member pulses and indicia pulses, said periods being equal in time to half cycles of said first square-wave generator output; a cathode-ray tube having electrostatic deflection electrodes and a radial deflection circuit; means for applying said output waveform of said first gate circuit to said radial deflection circuit; a phase-splitting circuit having as an input said output waveform of said first gate circuit and having push-pull output waveforms; a second gate circuit fed by said push-pull output waveforms, said second gate circuit operating to generate marker pulses at times corresponding to the occurrence of said reference pulses; a second square wave generator keyed alternately on and off by successive ones of said marker pulses; low-pass filter, phase-splitting and amplifying means operating to remove all but the fundamental frequency of the output of said second square-wave generator and to furnish to said electrostatic deflection electrodes voltages producing a circular sweep on said cathode-ray tube, thus displaying on said circular sweep indicia pips representing said scale of indicia and an index member pip representing the position of said index member relative to said scale, said index member pip indicating the location of said index member relative to said scanning period regardless of the spatial orientation of said cathode-ray tube.

14. In a telemetering system, the combination of a clock hand for indicating time; a first magnet mounted for rotation with said hand about the rotational axis of said hand; a continuously-rotating scanning member; a first magnetic pickup coil mounted on said scanning member, said first magnetic pickup coil being located on said scanning member to pass said first magnet at least once in each scanning period, whereby hand pulses are induced in said first pickup coil; a second magnet mounted on said scanning member; a second magnetic pickup coil stationarily located for encounter with said second magnet at least once in each scanning period, whereby reference pulses are induced in said second coil; a cathode-ray tube having a circular sweep circuit and a radial-deflection circuit; means for synchronizing said circular sweep circuit with said reference pulses; and means for applying said hand pulses to said radial-deflection circuit, thus producing on the screen of said cathode-ray tube a circular trace having a pip indicating the location of said hand relative to said scanning period, regardless of the spatial orientation of said cathode-ray tube.

15. In a telemetering system, the combination of a clock having a time scale associated therewith, said scale bearing spaced-apart relatively long and short indicia representing, respectively, major and minor divisions of time; magnetic pickup means, a member arranged cyclically to pass said magnetic pickup means, said member having protrusions of magnetic material thereon, said protrusions having widths proportional to the length of corresponding ones of said indicia, and said protrusions further being spaced apart by distances proportional to the spacing between corresponding ones of said indicia; means for setting up a magnetic field between said pickup means and said protrusions, whereby the reluctance of the path between said pickup means and said protrusions is varied in accordance with both the spacing and the width of said protrusions and a series of pulses is induced in said pickup means, the spacing between pulses of said series corresponding to said spacing of said indicia and the magnitude of said pulses corresponding to the respective lengths of said indicia; a cathode-ray tube; and means acting on the electron beam of said cathode-ray tube in accordance with said pulses for indicating on the display of said cathode-ray tube both the relative positions and the lengths of said indicia.

16. In a telemetering system, the combination of a clock having a face carrying a circular scale defined by spaced-apart, relatively long and short indicia respectively representing major and minor divisions of time; magnetic pickup means; a generally wheel-shaped member continuously-rotated about an axis through its center and so oriented that its circumference continuously passes said magnetic pickup means, the circumference of said member having thereon a plurality of protrusions of magnetic material, the width and spacing of said protrusions corresponding respectively to the length and spacing of said indicia, whereby the reluctance of the path between said pickup means and said protrusions is varied in accordance with both the spacing and the width of said protrusions; means for setting up a magnetic field between said pickup means and said protrusions, whereby a series of pulses is induced in said magnetic pickup means, the spacing between pulses corresponding to the spacing of said indicia and the magnitude of said pulses corresponding to the length of said indicia; a cathode-ray tube having a circular sweep and a radial-deflection circuit; means for causing said circular sweep to operate at the rotational frequency of said wheel-shaped member; and means for applying said series of pulses to said radial-deflection circuit, thereby producing on the circular trace of said cathode-ray tube radial pips having length and spacing proportional to the lengths and spacing of corresponding ones of said indicia, and hence presenting on the screen of said cathode-ray tube a display representing said circular scale of said clock face.

17. In a telemetering system, the combination of a clock having at least one hand and a face bearing a scale of indicia representing divisions of time, said hand being located to indicate time against said scale; a cathode-ray tube; means for sampling the position of said hand; means for registering the length and spacing of at least some of said indicia; and means for alternately visually displaying said indicia and the position of said hand relative to said indicia on the screen of said cathode-ray tube.

18. In a telemetering system, the combination of a clock having at least one hand and a face having a scale of indicia representing divisions of time, said hand being located to indicate time against said scale; a magnet mounted for rotation with said hand about the rotational axis of said hand; a continuously-rotating scanning member; a magnetic pickup coil mounted on said scanning member and located to pass said magnet at least once in each scanning period of said scanning member, whereby hand pulses are induced in said coil; a stator; a rotor for said stator coupled for rotation to said scanning member, said rotor having around its circumference a number of protrusions of magnetic material proportional to the number of indicia in said scale; means for setting up a magnetic field between said rotor and said stator, thereby inducing indicia pulses in said stator; a cathode-ray tube having a circular sweep circuit and a radial-deflection circuit; means for causing said circular sweep to operate at the rotational frequency of said scanning member; and means for applying to said radial-deflection circuit said hand pulses and said indicia pulses during alternate rotations of said scanning member, thus producing on the screen of said cathode-ray tube a circular presentation including radial pips representing said indicia and a radial pip representing the position of said hand relative to said scale.

19. In a telemetering system, the combination of a clock having at least one hand and a face bearing a scale of indicia representing divisions of time, said hand being located to indicate time against said scale; a magnet mounted for rotation with said hand about the rotational axis of said hand; a continuously-rotating scanning member; a magnetic pickup coil located on said scanning member to pass said magnet at least once in each scanning period of said scanning member, whereby hand pulses are induced in said magnetic pickup coil; a stator; a rotor for said stator coupled for rotation to said scanning member, said rotor having around its circumference a number of protrusions of magnetic material proportional to the number of said indicia in said scale; means for setting up a magnetic field between said rotor and said stator, thereby inducing indicia pulses in said stator; means for generating a square wave having a period equal to the scanning period of said scanning member; means for superimposing said hand pulse on one polarity of half cycles of said square wave and for superimposing said indicia pulses on the other polarity of half cycles of said square wave; a cathode-ray tube having a circular sweep circuit and a radial-deflection circuit; means for synchronizing the period of said circular sweep circuit with the period of said square wave; and means for applying said square wave with said superimposed hand and indicia pulses to said radial-deflection circuit, whereby there are displayed on the screen of said cathode-ray tube concentric circles, one of said circles carrying a hand pip corresponding in position to the position of said hand relative to said scale, and the other of said circles carrying indicia pips having the relative spacing of said indicia.

20. In a telemetering system, the combination of a clock having at least one hand and a face bearing a scale of indicia representing divisions of time, said hand being located to indicate time against said scale; a first magnet mounted for rotation with said hand about the rotational axis of said hand; a continuously-rotating scanning member; a first magnetic pickup coil mounted on said scanning member to pass said first magnet at least once in each scanning cycle, whereby hand pulses are induced in said first pickup coil; a stator; a rotor for said stator coupled for rotation to said scanning member, said rotor having protrusions of magnetic material around its circumference, the number of protrusions being proportional to the number of said indicia in said scale; means for setting up a magnetic field between said rotor and stator, thereby inducing indicia pulses in said stator; a second magnet mounted on said scanning member, a second magnetic pickup coil, said second coil being stationarily located for encounter with said second magnet at least once in each scanning period of said scanning member, thereby inducing reference pulses in said second coil; a cathode-ray tube having a circular sweep circuit and a radial-deflection circuit; means for synchronizing said circular sweep circuit with said reference pulses; and means for applying to said radial-deflection circuit said hand pulses and said indicia pulses during alternate rotations of said scanning member, thus producing on the screen of said cathode-ray tube a circular trace having indicia pips representing the position of said hand relative to said scale, said hand pip indicating the location of said hand relative to said scanning period, regardless of the spatial orientation of said cathode-ray tube.

21. In a telemetering system, the combination of a transmitter having means for generating a square wave having a complex wave superimposed thereon; said complex wave having waveform elements short by comparison with the period of said square wave, none of said elements extending further in any polarity than the horizontal portions of said square wave; a receiver having a cathode-ray tube; and means for causing the electronic beam of said cathode-ray tube to sweep circularly in synchronism with the repetition rate of said square wave, said last-named means comprising generating means for generating a pulse following each change of potential in said square wave, said last-named generating means comprising phase-splitting means having a positive and a negative output circuit furnishing respectively positive- and negative-polarity waveforms of said complex wave superimposed on said square wave; first differentiation means having an input and an output circuit and including a first rectification means, said first differentiation means being operative on said positive-polarity waveform to generate a peak on the leading change-of-potential edge of said positive-polarity waveform; second differentiation means having an input and an output circuit and including a second rectification means, said second differentiation means being operative on said negative polarity waveform to generate a peak on the leading change-of-potential edge of said negative-polarity waveform; said first and second differentiation means having a common output circuit; said first and second rectification means being biased to permit conduction of only said peaks of said positive- and negative-polarity waveforms, whereby said peaks appear in said common output circuit and so constitute pulses following each change of potential in said square wave; a circular sweep circuit for said cathode-ray tube; and means for synchronizing the operation of said circular sweep circuit with said pulses.

22. In a telemetering system, the combination of a transmitter having means for generating a square wave having a complex wave superimposed thereon; said complex wave having waveform elements short by comparison with the period of said square wave, none of said elements extending further in any polarity than the horizontal portions of said square wave; a receiver having a cathode-ray tube; and means for causing the electronic beam of said cathode-ray tube to sweep circularly in synchronism with the repetition rate of said square wave, said last-named means comprising generating means for generating a pulse following each change of potential in said square wave, said last-named generating means comprising phase-splitting means having a positive and a negative output circuit furnishing respectively positive- and negative-polarity waveforms of said complex wave superimposed on said square wave; first differentiation means having an input and an output circuit and including a first rectification means, said first differentiation means being operative on said positive-polarity waveform to generate a peak on the leading change-of-potential edge of said positive-polarity waveform; second differentiation means having an input and an output circuit and including a second rectification means, said second differentiation means being operative on said negative-polarity waveform to generate a peak on the leading change-of-potential edge of said negative-polarity waveform; said first and second differentiation means having a common output circuit; said first and second rectification means being biased to permit conduction of only said peaks of said positive- and negative-polarity waveforms, whereby said peaks appear in said common output circuit and so constitute pulses following each change of potential in said square wave; means for generating a second square wave having half the period of said first square wave, said second square wave generating means being synchronized by said pulses; filter means operating to pass only the fundamental frequency of said second square wave; and phase-splitting means operating to generate voltages from the output waveform of said filter means for circularly deflecting said electronic beam of said cathode-ray tube.

23. In a telemetering system, the combination of a transmitter having means for generating a square wave having a complex wave superimposed thereon; said complex wave having waveform elements short by comparison with the period of said square wave, none of said elements extending further in any polarity than the horizontal portions of said square wave; a receiver having a cathode-ray tube; and means for causing the electronic beam of said cathode-ray tube to sweep circularly in synchronism with the repetition rate of said square wave, said last-named means comprising generating means for generating an impulse following each change of potential in said square wave, said last-named generating means comprising phase-splitting means having a first and a second output circuits furnishing respectively positive and negative polarity waveforms of said complex waveform superimposed on said square wave; a first differentiation circuit comprising the series connection across said first output circuit of capacitive means, unidirectional conductive means, and resistive means; a second differentiation circuit comprising the series connection across said second output circuit of capacitive means, unidirectional conductive means, and said resistive means; said first and second differentiation circuits being respectively supplied by said first and second output circuits and operative to differentiate said positive and negative polarity waveforms; said unidirectional conductive means each being self-biased and connected to pass only the positive portions of said differentiated positive and negative polarity waveforms lying above the most positive portion of said waveforms before differentiation, whereby the output voltage developed across said resistive means comprises pulses developed in said first and second differentiation means, said pulses occurring at the change-of-potential points of said square wave.

24. In a telemetering system, the combination of a transmitter having means for generating a square wave having a complex wave superimposed thereon; said complex wave having waveform elements short by comparison with the period of said square wave, none of said elements extending further in any polarity than the horizontal portions of said square wave; a receiver having a cathode-ray tube; and means for causing the electronic beam of said cathode-ray tube to sweep circularly in synchronism with the repetition rate of said square wave, said last-named means comprising generating means for generating a pulse following each change of potential in said square wave, said last-named generating means comprising phase-splitting means having first and second output circuits furnishing respectively positive and negative polarity waveforms of said complex wave superimposed on said square wave; a ground plane maintained at a fixed reference potential; a first differentiating circuit comprising the series connection of said first output circuit, a first capacitor, a first electron discharge device having at least an anode and a cathode, an output resistor, and said ground plane, and having a first discharge resistor connected from the junction of said first capacitor and said first electron discharge device to said ground plane; a second differentiation circuit comprising the series connection of said second output circuit, a second capacitor, a second electron discharge device having at least an anode and a cathode, said output resistor and said ground plane, and having a second discharge resistor connected from the junction of said second capacitor and said second electron discharge device to said ground plane; said first and second electron discharge device each being self-biased and connected to pass only the positive portions of said differentiated positive and negative polarity waveforms lying above the most positive portion of said waveforms before differentiation; said first and second differentiation circuits having time constants proportioned to produce a short pulse at the leading change of potential points of said square wave, whereby the output voltage waveform developed across said output resistor, being connected to said first and second differentiation circuits in common, comprises positive, relatively short pulses occurring at each change of potential point in said square wave.

References Cited in the file of this patent

UNITED STATES PATENTS

| | | |
|---|---|---|
| 2,307,965 | Shepherd | Jan. 12, 1943 |
| 2,312,761 | Hershberger | Mar. 2, 1943 |
| 2,403,889 | DiToro | July 9, 1946 |
| 2,403,890 | Johnson | July 9, 1946 |
| 2,436,827 | Richardson et al. | Mar. 2, 1948 |
| 2,552,009 | Laws et al. | May 8, 1951 |
| 2,575,342 | Gridley | Nov. 20, 1951 |
| 2,578,939 | Moran, Jr. | Dec. 18, 1951 |
| 2,609,143 | Stibitz | Sept. 2, 1952 |
| 2,680,241 | Gridley | June 2, 1954 |